(12) United States Patent
Weizman

(10) Patent No.: US 11,144,536 B2
(45) Date of Patent: Oct. 12, 2021

(54) SYSTEMS AND METHODS FOR REAL-TIME ANALYTICS DETECTION FOR A TRANSACTION UTILIZING SYNCHRONOUSLY UPDATED STATISTICAL AGGREGATION DATA

(71) Applicant: NICE LTD., Ra'anana (IL)

(72) Inventor: Shlomi Weizman, Modiin (IL)

(73) Assignee: NICE LTD., Ra'anana (IL)

( * ) Notice: Subject to any disclaimer, the term of this patent is extended or adjusted under 35 U.S.C. 154(b) by 247 days.

(21) Appl. No.: 16/509,593

(22) Filed: Jul. 12, 2019

(65) Prior Publication Data
US 2020/0409932 A1 Dec. 31, 2020

Related U.S. Application Data

(60) Provisional application No. 62/866,821, filed on Jun. 26, 2019.

(51) Int. Cl.
| | |
|---|---|
| *G06F 16/23* | (2019.01) |
| *G06F 16/27* | (2019.01) |
| *G06F 9/46* | (2006.01) |
| *G06F 9/54* | (2006.01) |
| *H04L 9/08* | (2006.01) |
| *G06F 16/28* | (2019.01) |

(52) U.S. Cl.
CPC .......... *G06F 16/2365* (2019.01); *G06F 9/466* (2013.01); *G06F 9/546* (2013.01); *G06F 16/2343* (2019.01); *G06F 16/27* (2019.01); *G06F 16/288* (2019.01); *H04L 9/0861* (2013.01)

(58) Field of Classification Search
CPC .. G06F 16/2343; G06F 16/2365; G06F 16/27; G06F 16/288; G06F 9/466; G06F 9/546
USPC ........................................................ 707/687
See application file for complete search history.

(56) References Cited

U.S. PATENT DOCUMENTS

| | | | | |
|---|---|---|---|---|
| 5,895,453 | A  * | 4/1999 | Cook ................... | G06Q 20/202 705/22 |
| 7,386,105 | B2 * | 6/2008 | Wasserblat ......... | G06Q 20/4016 379/114.14 |
| 7,728,870 | B2 * | 6/2010 | Rudnik .................. | H04N 5/765 348/143 |

(Continued)

*Primary Examiner* — Sheree N Brown
(74) *Attorney, Agent, or Firm* — Pearl Cohen Zedek Latzer Baratz LLP

(57) ABSTRACT

A system and method for performing real-time analytics detection where a current profile update is derived from a current incoming transaction for an entity and stored in a profile update table, an up-to-date profile for the entity is derived from the most recent profile stored in a profile table and from all recent profile updates stored in the profile update table for the entity which are more recent than the last time the most recent profile was last updated, the up-to-date profile is utilized to perform the detection, and, the current profile is updated in a consistent manner, without utilizing an update lock on the profile table, by only updating the profile in the profile table based on the recent profile updates which are earlier than a current time minus a synchronization period which is larger than a maximum potential time difference between different clocks in the system.

15 Claims, 12 Drawing Sheets

(56) References Cited

U.S. PATENT DOCUMENTS

| | | | | |
|---|---|---|---|---|
| 7,907,714 B2* | 3/2011 | Baniak | ............. | H04Q 3/0033 |
| | | | | 379/201.02 |
| 7,953,665 B2* | 5/2011 | Deeds | ............. | G06Q 30/02 |
| | | | | 705/51 |
| 8,086,528 B2* | 12/2011 | Barrett | ............. | G06Q 20/4037 |
| | | | | 705/38 |
| 8,661,538 B2* | 2/2014 | Cohen-Ganor | ....... | G06Q 40/00 |
| | | | | 726/22 |
| 8,688,507 B2* | 4/2014 | Kennis | ............. | G06Q 40/00 |
| | | | | 705/7.37 |
| 9,092,641 B2* | 7/2015 | Petersen | ............. | G06F 21/6227 |
| 10,951,488 B2* | 3/2021 | Wright | ............. | H04L 67/22 |
| 2005/0209876 A1* | 9/2005 | Kennis | ............. | G06Q 10/06311 |
| | | | | 726/1 |
| 2005/0278192 A1* | 12/2005 | Cantini | ............. | G06Q 40/025 |
| | | | | 705/39 |
| 2009/0043573 A1* | 2/2009 | Weinberg | ............. | G10L 17/06 |
| | | | | 704/223 |
| 2009/0055828 A1* | 2/2009 | McLaren | ............. | G06Q 30/02 |
| | | | | 718/103 |
| 2011/0307257 A1* | 12/2011 | Pereg | ............. | G06Q 30/0202 |
| | | | | 704/251 |
| 2012/0221532 A1* | 8/2012 | Watanabe | ............. | G06F 16/1827 |
| | | | | 707/687 |
| 2013/0204894 A1* | 8/2013 | Faith | ............. | G06F 16/9024 |
| | | | | 707/769 |
| 2015/0293755 A1* | 10/2015 | Robins | ............. | G06F 9/44526 |
| | | | | 717/104 |
| 2018/0181962 A1* | 6/2018 | Barnhardt | ............. | G06Q 20/4016 |

\* cited by examiner

Expression Builder – Flow: Copy of UpdateProfile4Times\[Execute Update Profile]\amount ...

Test  Max rows: 100

[Tuple]
 Daily  <Set>
 Monthly  <Set>
 DailyPerMonth  <Set>

Monthly (Row #2 of [Tuple]) (Total 2 rows)

| N... | month | #.₀ count | #.₀ sum | #.₀ min | #.₀ max | #.₀ average |
|---|---|---|---|---|---|---|
| 1 | 1/1/2019 12:00:00 AM | 6.0 | 4,500.00 | 500.00 | 1,000.0 | 750.0 |
| 2 | 2/1/2019 12:00:00 AM | 6.0 | 2,400.00 | -200.0 | 1,200.0 | 400.0 |

Scratchpad Results

FIG. 10

| Expression Builder | | | | | | | |
|---|---|---|---|---|---|---|---|
| ✱ ▦ ∣ ∷ Test | Max rows: 100 | | | | | | ✖ |
| ⋄ ⊙ [Tuple] | | | | | | | |
| ▦ Daily | <Set> | | | | | | |
| ▦ Monthly | <Set> | | | | | | |
| ▦ DailyPerMonth | <Set> | | | | | | |
| ✱ ▦ Monthly (Row #2 of [Tuple]) (Total 2 rows) | | | | | | | ✖ |

| N... | 🕒 month | #.₀ count | #.₀ sum | #.₀ min | #.₀ max | #.₀ average |
|---|---|---|---|---|---|---|
| 1 | 1/1/2019 12:00:00 AM | 8.0 | 6,000.00 | 500.00 | 1,000.0 | 750.0 |
| 2 | 2/1/2019 12:00:00 AM | 8.0 | 6,000.00 | -200.0 | 2,000.0 | 775.0 |

▦ Scratchpad Results

FIG. 11

SYSTEMS AND METHODS FOR REAL-TIME ANALYTICS DETECTION FOR A TRANSACTION UTILIZING SYNCHRONOUSLY UPDATED STATISTICAL AGGREGATION DATA

CROSS-REFERENCE TO RELATED APPLICATIONS

This application claims priority from U.S. Provisional Patent Application No. 62/866,821, filed Jun. 26, 2019, entitled "SYSTEMS AND METHODS FOR REAL-TIME ANALYTICS DETECTION FOR A TRANSACTION UTILIZING SYNCHRONOUSLY UPDATED STATISTICAL AGGREGATION DATA", which is incorporated herein by reference.

FIELD OF THE INVENTION

Embodiments of the invention relate generally to the field of real-time analytics used for example in analysis of transactions, or other applications, and, in particular real-time fraud detection.

BACKGROUND OF THE INVENTION

Typically, real-time analytics detection systems use statistical aggregation data that was calculated from previous transactions. The statistical aggregation data may be stored in a container object that is called a profile. The statistical aggregation data stored in the profile may be referred to as profile aggregation data.

Examples of statistical aggregation data that may be stored for each entity (e.g., a customer) in a profile can be transaction statistics such as cash withdrawal sum per month for the last 12 months or an average daily credit card payment in the last 3 months. The profile may be accessed by a single key, such as a credit card number, an account number, a company's name or a person's name. The profile may be a table in a database having rows of recent profile aggregation data for each profile key. Profile aggregation data may be statistical aggregation data derived from or associated with transactions or other data or events that were received within a predetermined time period for an entity that can be utilized to understand how that entity acts and why. Profile aggregation data may be statistics on regular activity or typical activity of an entity over a certain time period or periods.

Conventional approaches may require retrieving the most recent profile aggregation data from a profile table which has an exclusive update lock on the row, which includes the most recent profile aggregation for the key included in the incoming transaction. By most recent profile aggregation data, Applicant refers to profile aggregation data that is stored in the profile table, but which is not up-to-date because it was not calculated from data from at least a currently incoming transaction that is being analyzed. The exclusive update lock prevents other processes from modifying that profile row until the lock is released, e.g., until after the recent profile aggregation data has been updated based on data in the incoming transaction. New profile aggregation data is then calculated based on the most recent profile aggregation data and the data in the incoming transaction.

However, because it is desirable for real-time analytics detection systems to respond to incoming transactions in a few milliseconds, being slowed down by waiting until the an exclusive update lock is released is not desirable, as it may delay performing detection of whether the incoming transaction should be allowed, e.g., as not fraudulent. Because of this, conventional approaches to real-time analytics detection may require that the detection and the calculation of the statistical aggregation data from values included in received transactions to be done asynchronously. The result of this is that the statistical aggregation data utilized for analyzing the incoming transaction does not include statistics for at least the incoming transaction and any other transaction for that key that the system is in the process of including in the most recent statistical aggregation data. In other words, conventional approaches utilize inaccurate out-of-date statistical aggregation data to detect irregularities in incoming transactions, e.g., such as a fraudulent transaction.

Accordingly, there is a need to perform real-time analytics detection utilizing more accurate and up-to-date statistical aggregation data which includes data derived from the most recent transaction activities.

SUMMARY OF THE INVENTION

A real-time analytics detection system and method may include, in response to receiving a current incoming transaction, retrieving, from a profile table of a database, a most recent profile aggregation data for an entity associated with the incoming transaction; deriving a current profile update from the current incoming transactions; storing the current profile update in a profile update table of the database, the profile update including at least one update amount, a timestamp, and merging instructions describing how to update the most recent profile aggregation data based on the at least one update amount; retrieving, from the profile update table of the database all recent profile updates corresponding to the entity, wherein each of the recent profile updates have a timestamp which is more recent than the last time the most recent profile aggregation data was updated; deriving a first up-to-date profile aggregation data from the most recent profile aggregation data and the retrieved recent profile updates; and storing the first up-to-date profile aggregation data in a memory. The most recent profile aggregation data may include statistical aggregators derived from previously received transactions associated with the entity. The profile update may include at least one update amount, a timestamp, and merging instructions describing how to update the statistical aggregators of the most recent profile aggregation data based on the at least one update amount.

The most recent profile aggregation data in the profile table may be updated asynchronously to the performance of real-time analytics detection in a consistent manner without utilizing an update lock on the profile table.

In some embodiments of the invention the system and method may include, after performing the real-time analytics detection, transmitting a current profile re-calculation trigger to a message queue. The current profile re-calculation trigger may be associated with the current profile update. The re-calculation trigger may include a primary key which is associated with the entity and which was derived from a previous transaction associated with the entity. In some embodiments of the invention, the system and method may, after performing the real-time analytics detection: extract a next primary key from a next re-calculation trigger; retrieve a profile row from the profile table which comprises profile aggregation data and the next primary key; retrieve at least one profile update row from the profile update table, the at least one profile update row including the primary key, a recent profile update, and a timestamp which is more recent than the last time the most recent profile aggregation data was last updated, and earlier than a current time in a clock of the database minus a predetermined synchronization period; and derive a second up-to-date profile aggregation data from the retrieved profile row and the retrieved at least one profile update rows.

The synchronization period may be larger than a maximum potential time difference between different clocks in the real-time analytics detection system and in an order of milliseconds.

In some embodiments of the invention, the system and method may update the profile aggregation data in the profile row in the profile table to be the second up-to-date profile aggregation data if a most recent timestamp of the at least one profile update row is more recent than the last time the most recent profile aggregation data was last updated. The profile row may further include a last update timestamp which indicates when the profile row was last updated, and the one or more processors are configured to update the last update timestamp of the profile row to be the most recent timestamp of the at least one profile update row after updating the profile row in the profile table In some embodiments of the invention, the system and method may perform real-time analytics detection on the current incoming transaction by utilizing the first up-to-date profile aggregation data to determine to determine if the current incoming transaction is valid, should be blocked, or if the one or more processors should generate an alert.

BRIEF DESCRIPTION OF THE DRAWINGS

Dimensions of features shown in the figures are chosen for convenience and clarity of presentation and are not necessarily shown to scale. The invention, both as to organization and method of operation, together with objects, features and advantages thereof, can be understood by reference to the following detailed description when read with the accompanied non-limiting drawings. Embodiments of the invention are illustrated by way of example and not limitation in the figures of the accompanying drawings, in which like reference numerals indicate corresponding, analogous or similar elements.

FIG. 10 is a screenshot of a profile fetch before transmitting a new incoming transaction to a real-time analytics detection system, according to embodiments of the invention.

FIG. 11 is a screenshot of a profile fetch after transmitting two new incoming transactions to the real-time analytics detection system but before the profile has been updated in the profile table, according to embodiments of the invention.

Figure 1A:
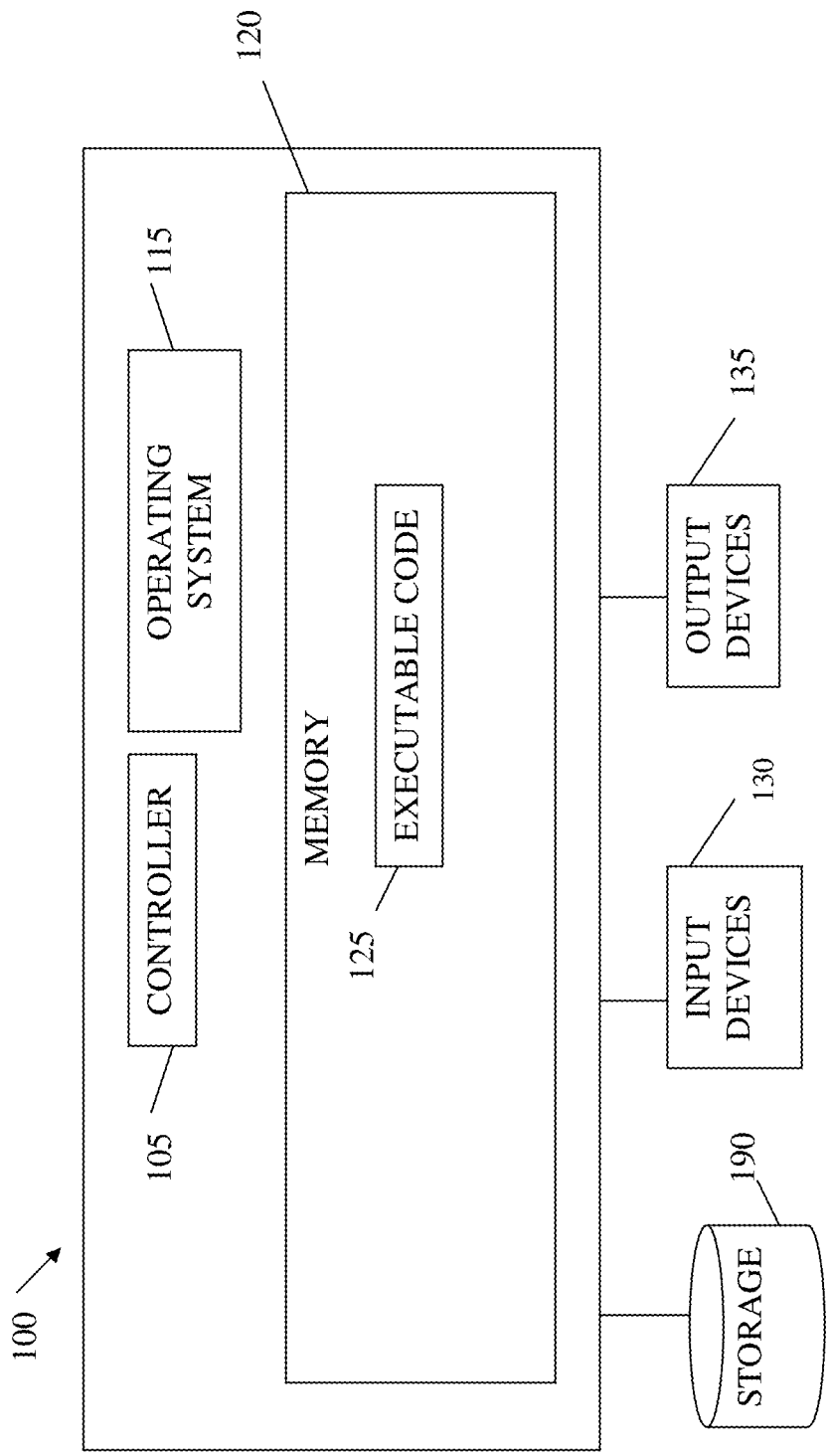
FIG. 1A is a block diagram of a computer system used with or executing embodiments of the present invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION OF THE INVENTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Embodiments of the invention may improve existing technology for real-time or near-real-time analysis of large amounts of data which is stored and which may have data coherency (e.g. preventing multiple writes simultaneously) requirements. Embodiments may improve applications such as real-time analytics detection, such as those utilized to detect and prevent fraudulent transactions, to prevent money laundering, or to perform risk management by providing the detection process with an up-to-date profile that contains statistical aggregation data calculated from the most recent updates. Other applications may be used with embodiments of the present invention, and may be improved by embodiments of the present invention.

Embodiments of the invention may improve computer data storage technology. For example, to be able to provide up-to-date profile aggregation data, which was derived in part from an incoming transaction, to the detection process for that incoming transaction, embodiments of the invention may utilize a new data structure which includes two structures such as two tables (e.g., a profile table and a profile update table), and may utilize two different merging algorithms (e.g., a synchronous and an asynchronous update method) for synchronizing updates to the most recent profile aggregation data. Data storage and merging algorithms according to embodiments of the present invention may be used with data other than profiles and transactions. The transaction may be an instance of buying or selling something, a business deal, an action of conducting business, an exchange or interaction between people, a login attempt, or any change to an account or account information. The transaction as referred to in the present application may refer to both the actual event of a transaction and the data structure of the transaction.

For example, embodiments of the invention may utilize a first merging algorithm to temporarily update the most recent data, such as profile aggregation data for an entity associated with the current incoming transaction, synchronously with or as part of analysis such as detecting whether the current incoming transaction is fraudulent, is part of a money laundering attempt, or perform risk management. In other applications, other analysis may be performed. In response to receiving the incoming transaction for performing real-time analytics detection, for example to determine if the current incoming transaction is valid, should be blocked, or if the one or more processors should generate an alert, embodiments of the invention may perform a first merging algorithm for deriving up-to-date profile aggregation data for an entity associated with the incoming transaction synchronously to determining whether the incoming transaction is fraudulent or is part of a money laundering attempt, or synchronously to performing risk management. The first merging algorithm may utilize a profile table which stores the most recent profile aggregation data that was previously derived for that entity.

Unlike conventional approaches, in one embodiment the profile table does not utilize an exclusive update lock. An exclusive update lock is a known method which prevents more than one application from editing, overwriting, or accessing information in a data structure such as a profile table while that information is being edited. Conventional approaches require such an exclusive update lock to prevent the most recent profile aggregation data from being updated wrongly when processing multiple updates in real-time. In other words, conventional approaches assume that such an exclusive update lock is necessary to properly synchronize updates to the most recent profile aggregation data. For example, it is likely that a same profile will be updated simultaneously when many sequential transactions are performed without much time between. If two different applications have read the most recent profile aggregation data and are both performing aggregation at the same time, one of the applications could overwrite the results of the other application.

Assuming applications A and B simultaneously read the same profile object that contains the amount 1,000. Application A adds the value 1,000 and B adds the value 500. If application A precedes B and writes the new calculated profile to the database with the value 2,000, application B will then overwrite the value with 1,500. Thus, eventually, the profile will not be updated properly and some updates that could be significant in term of statistics data were lost. Due to that, an exclusive write lock on the profile row is obtained by the application from the time of the read and during the profile calculation until the profile is written to the database. The drawback of locking is that when an exclusive lock is obtained by one application, the other applications that are updating the same profile will not be able to obtain a write lock and therefore will wait until the lock will be freed. This also exposes the applications to many timeout errors.

An embodiment of the invention may prevent such overwriting as described elsewhere herein by utilizing a second merging algorithm to update, without utilizing an exclusive update lock on the profile table, a most recent data saved to the profile table asynchronously to performing an analysis step. For example, an embodiment may utilize a second merging algorithm to update the most recent profile aggregation data asynchronously to performing the detection step. The second merging algorithm may merge the most recent profile aggregation data that is in the profile table with the profile updates from the profile update table which were derived from transactions later than the time the most recent profile aggregation data was last updated minus a synchronization period in the order of milliseconds. The synchronization period may be utilized to prevent missing an update that needs to be merged into the most current profile aggregation data.

For example, all the clocks in each coordinator node of embodiments of the invention may be synchronized; however, because there may be a time difference, typically in the order of milliseconds, between the clocks in different coordinator nodes, pending updates may have timestamp values that are not sequential, such that a first update derived by a first node earlier than a second update that was derived by a second node may be given a later time stamp than the second update due to the time difference between the clocks in the different coordinator nodes. The coordinator node may be a node in a NoSQL database cluster chosen by a client to execute an operation, such as an operation that inserts new profile updates to the profile update table.

In some embodiments of the invention, if the most current profile aggregation data is updated with the first update which has a later time stamp than the second update, the second update may not be merged because, even though it was derived after the first update, it was given an earlier time stamp.

To avoid this problem, the synchronization period may be set to a time period that is larger than a maximum potential time difference between the different clocks in embodiments of the invention. This may allow multiple concurrent processes to calculate profiles, and may allow horizontal scalability while ensuring consistency even though the profile updates may not receive 100% sequential timestamps because of the differences between the different clocks (on the order of milliseconds).

Reference is made to FIG. 1A, which is a block diagram of a computer system used with or executing embodiments of the present invention. One or more computer systems, such as shown in FIG. 1A, may carry out methods as described herein, and may function as servers as modules as described herein.

The processor 100 may include a controller 105 that may be, for example, a central processing unit processor (CPU), a chip or any suitable computing or computational device, an operating system 115, a memory 120, a storage 190, input devices 130 and output devices 135.

Operating system 115 may be or may include any code segment designed and/or configured to perform tasks involving coordination, scheduling, arbitration, supervising, controlling or otherwise managing operation of the processors 100, for example, scheduling execution of programs. Operating system 115 may be a commercial operating system. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units.

Executable code 125 may be any executable code, e.g., an application, a program, a process, task or script. Executable code 125 may be executed by controller 105 possibly under control of operating system 115. For example, executable code 125 may be an application that performs methods for performing data coordination, data storage, real-time analytics, detection, etc. as described herein. Where applicable, executable code 125 may carry out operations described herein in real-time. The processor 100 and executable code 125 may be configured to update, process and/or act upon information at the same rate the information, or a relevant event, are received. In some embodiments, more than one computing device 100 may be used. Methods for performing data coordination, data storage, real-time analytics detection, etc. as described herein may be performed in real-time by executable code 125 when executed on the one or more processors 100.

Storage 190 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data, such as profile aggregation data, profile updates, merging instructions for profile updates, and re-calculation triggers, or code used by method according to embodiments of the invention may be stored in storage 190 and may be loaded from storage 190 into memory 120 where it may be processed by controller 105.

Embodiments of the invention may include an article such as a non-transitory computer or processor readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 120 may store executable code 125 such that controller 105 is configured to carry out embodiments disclosed herein by executing code 125.

Input devices 130 may be or may include a mouse, a keyboard, a touch screen or pad or any suitable input device. Output devices 135 may include one or more displays, speakers and/or any other suitable output devices. Any applicable input/output (I/O) devices may be connected to the processor 100 as shown by blocks 130 and 135.

The processor 100 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data, such as profile aggregation data, profile updates, merging instructions for profile updates, and re-calculation triggers may be stored in memory 120 where it may be processed by controller 105.

Embodiments of the invention may include an article such as a non-transitory computer or processor readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 120 may store executable code 125 such that controller 105 is configured to carry out embodiments disclosed herein by executing code 125.

Figure 1B:
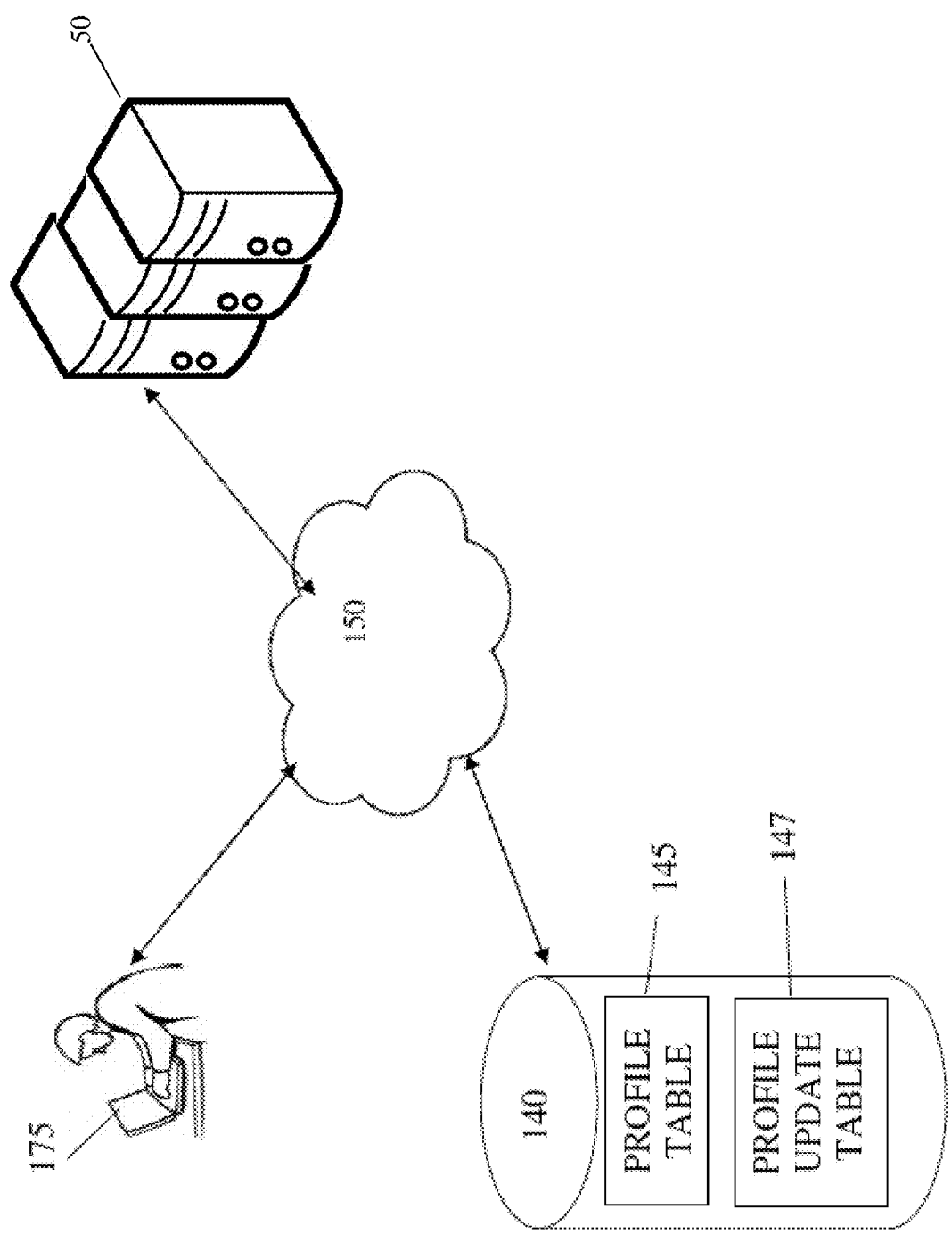
FIG. 1B is an exemplary real-time analytics detection system, according to embodiments of the present invention.

Reference is made to FIG. 1B, which is a block diagram of an exemplary real-time analytics detection system, according to embodiments of the present invention In some embodiments of the invention, a real-time analytics detection system includes a server 50, a database 140, and a network 150. The server 50 and the database 140 may communicate via the network 150. The server 50 may be or include one or more processors (e.g., processor 100 of FIG. 1A).

The database 140 may be for example a NoSQL Database of the type Cassandra. Database 140 may include a profile table 145 and profile update table 147. Server 50 may be configured to perform embodiments as described herein. For example, server 50 may receive a current incoming transaction to perform real-time analytics detection in order to determine if the current incoming transaction is valid, should be blocked, or if the one or more processors should generate an alert. The current incoming transaction may be a transaction which the server 50 is currently performing real-time analytics detection on in order to determine whether to allow or block the transaction, or generate an alert based on the transaction.

The server 50 may be configured to, in response to receiving a current incoming transaction, retrieve, from the profile table 145, a most recent profile aggregation data for an entity associated with the current incoming transaction.

The server 50 may be configured to derive a most recent profile aggregation data for a plurality of entities from previous transactions associated with the plurality of entities. The server 50 may be configured to store, in the database 140, the most recent profile aggregation data for the plurality of entities in the profile table 145.

Server 50 may be configured to, in response to receiving the current incoming transaction, derive a current profile update from the current incoming transaction, and store the current profile update in the profile update table 147. The profile update may include for example at least one update amount, a timestamp, and merging instructions describing how to update the most recent profile aggregation data based on the at least one update amount. The timestamp may be, for example, an indication of when the corresponding rows were last updated and may be a time Universally Unique Identifier ("TIMEUUID") type or value, or another expression of time. The at least one update amount may be derived from the current incoming transaction, such as an amount of money the current incoming transaction is for. For example, if the transaction is for $200, the update amount may be $200 and the merging instructions may be, for example, to check if the update amount is lower than the lowest transaction amount during a predetermined period, and if the update amount is lower than the lowest transaction, to replace the lowest transaction amount with the update amount.

Server 50 may be configured to retrieve, from the profile update table 147 all recent profile updates corresponding to the entity. Each of the recent profile updates may have a timestamp which is more recent in time than the last time the most recent profile aggregation data was updated. The server 50 may be configured to derive a first up-to-date profile aggregation data from the most recent profile aggregation data and the retrieved recent profile updates, and store the first up-to-date profile aggregation data in memory (e.g., memory 120 of FIG. 1). Server 50 may be configured to perform real-time analytics detection on the current incoming transaction by utilizing the first up-to-date profile aggregation data to determine to determine if the current incoming transaction is valid, should be blocked, or if the one or more processors should generate an alert.

In some embodiments of the invention, server 50 may be configured to update the most recent profile aggregation data in the profile table to be the first up-to-date profile aggregation data asynchronously to the one or more processors performing real-time analytics detection. Server 50 may be configured to, after performing the real-time analytics detection, transmit a current profile re-calculation trigger to a message queue. The re-calculation trigger may be associated with the current profile update, and may include a primary key which is associated with the entity and which was derived from a previous transaction associated with the entity. Server 50 may be configured to, after performing the real-time analytics detection, extract a next primary key from a next re-calculation trigger, retrieve a profile row from the profile table 145 which comprises profile aggregation data and the next primary key, retrieve at least one profile update row from the profile update table 147, and derive a second up-to-date profile aggregation data from the retrieved profile row and the retrieved at least one profile update rows. The at least one profile update rows may include the primary key, a recent profile update, and a timestamp which is more recent than the last time the most recent profile aggregation data was last updated, and earlier than a current time in a clock of the database minus a predetermined synchronization period.

Server 50 may be configured to update the profile aggregation data in the profile row in the profile table 145 to be the second up-to-date profile aggregation data if a most recent timestamp of the at least one profile update row is more recent than the last time the most recent profile aggregation data was last updated. The profile row may include a last update timestamp which indicates when the profile row was last updated. In such embodiments, the server 50 may be configured to update the last update timestamp of the profile row to be the most recent timestamp of the at least one profile update row after updating the profile row in the profile table 145. The predetermined synchronization period may be larger than a maximum potential time difference between different clocks in the server 50 and may be in an order of milliseconds.

Each row in the profile table may include profile aggregation data associated with a certain entity of the plurality of entities. The profile table 145 may include profile rows, for each different entity associated with a previously received transaction, which includes the most recent profile aggregation data for that entity.

Server 50 may be configured to update the most recent profile aggregation data in a consistent manner without utilizing an update lock on the profile table. More specifically, unlike conventional approaches, in some embodiments of the invention, the profile table does not contain an exclusive update lock which prevents other processes from modifying any of the profile rows until the lock is released. In conventional approaches, if a first process is holding a write exclusive lock for a profile row for too long, (e.g., when there are many pending updates to compute for a large profile) other processes which need to update the same profile row in the database may receive a timeout error. Not utilizing an exclusive update lock avoids this issue, however, as described elsewhere herein, conventional approaches teach using such a lock because it is commonly believed that such a lock is necessary to properly synchronize updates to the most recent profile aggregation data.

The profile table 145 may include various columns, such as a column for storing information which can be used to identify the entities associated with the profile rows; a column for storing information that can be utilized to identify when the corresponding rows were lasted updated; and at least one column for storing the most recent profile aggregation data. While rows and columns are discussed, other formats and organizational methods may be used.

The column (or other structure) for storing information which can be used to identify the entities associated with the profile rows may be a column for storing PKs ("profile-keys"), each of which are associated with a particular entity. The profile-key may be a unique identifier of an entity. Other unique identifiers may be used. For example, a profile-key may be a credit card number, an account number, a company name, or a person's name. The profile-keys in the profile-key row may be derived, extracted, or taken from data from transactions that have been sent to embodiments of the invention. For example, embodiments of the invention may be able to recognize a formatting structure of things such as credit card numbers, account numbers, company names, or persons' names, in the transaction data. The profile-key may be of type TEXT. The profile table 145 may also include a profile identification (ID) column which is of type TEXT. A profile ID may be stored in a location other than a column. The profile id column may store a profile ID for each row. The profile ID may identify a type of the information that the corresponding profile key is or is derived from. For example, if the profile key in a profile row is or is derived from a credit card number, then the profile ID may be configured to identify that its corresponding profile key (e.g., profile key in the same row) is a credit card number or was derived from a credit card number.

The at least one column (or other location) for storing the profile aggregation data may include, for example, columns for storing profile aggregation data derived from transactions that were received within a predetermined time period for an entity that can be utilized to understand how that entity acts and why. The profile aggregation data may be statistical aggregation data which expresses the data analyzed in the transactions in summary form for statistical analysis. For example, the profile aggregation data columns may store profile aggregation data, such as a sum of cash withdrawals associated with the profile-keys (e.g., that the entities made) within a certain time period (e.g., per month for the last 12 months) over multiple transactions; an amount of average credit card payments within a predetermined period (e.g., within the last 3 months) associated with the profile-keys over multiple transactions; an average of transaction values associated with the profile-keys over multiple transactions; a minimum and maximum amount of transaction values associated with the profile-keys over multiple transactions; and an amount of transactions that the most recent profile aggregation data was derived from for each of the entities. The at least one column for storing the most recent profile aggregation data may be in BLOB ("binary large object") format. While transactions are discussed, other data objects or data may be used, and thus profile aggregation data may refer to summary or statistical data of other events or data, in other embodiments.

The column for storing a time that the corresponding rows were last updated may include last update insertion timestamp that identifies when the corresponding rows were last updated. The last update insertion timestamp may be a time Universally Unique Identifier ("TIMEUUID") type or value, or another expression of time. The profile table may also include a column for storing a date that that the corresponding rows were last updated. The last update day column may be a column of type Date. The last update day column maybe used as a CK ("Clustering Key"), and the corresponding rows may be sorted in descending order.

The last update day of a profile row may be assigned a date in Unix/epoch time (e.g., as a number of seconds that have elapsed since 1/1/1970 00:00) derived from a transaction date and time of the most recent transaction from which the most recent updates of that profile row were derived. In some embodiments of the invention which assign an epoch time to the last update day, only one profile row may be created in the profile table 145 per profile key. The last update day of a profile row may be assigned a date and time derived from a transaction date and time of the most recent transaction from which the most recent updates of that profile row were derived.

A profile snapshot for the profile aggregation data in the profile table 145 per day may be generated. In some embodiments of the invention where the last update day column is used as a clustering key, a new profile snapshot row may be created when the day changes.

In some embodiments of the invention which format the last update day in Unix or epoch time, the epoch time may be utilized when there is a need to remove some of the profile updates from the profile and re-calculate the profile after removing the relevant unneeded updates from the update table. For example, it is possible to pick a profile from a certain day and start re-calculating the profile from the profile from that day while applying all the updates that were added after the epoch timestamp. This may significantly reduce the amount of calculations needed to provide such a profile snapshot.

A transaction may be flagged (e.g., as fraudulent, as part of a money laundering scheme, or any other reason). Some embodiments of the invention may search for each update row associated with a transaction ID associated with the flagged transaction, may remove the profile update rows associated with that transaction ID, and then re-calculate each profile row associated with the removed profile update rows using a profile snapshot row of a certain day while only considering a subset of update rows that were added since the profile snapshot.

An example structure for the profile table 145 may be the following:

| Profile-key (TEXT PK) | Profile-ID (TEXT) | Profile-data (BLOB) | Last-update-insertion-timestamp (TIMEUUID) | Last-update-day (Date CK) |
|---|---|---|---|---|

A primary key of the profile table 145 may be a compound key which includes the profile key, the profile ID and the last-update-day.

The profile table may include a profile object. The profile object may be a container object that stores statistical aggregation data for an entity that was calculated from incoming transaction values over a time period.

| Time Period | Ct | Sum | Min | Max | Avg |
|---|---|---|---|---|---|
| 1/1/2019 12:00:00 AM | 2.0 | $1,500 | $500 | $1,000 | $750 |
| 2/1/2019 12:00:00 AM | 2.0 | $ 100 | –$200 | $ 300 | $ 50 |

For example, as can be seen in the first PK column above, both rows are associated with the same profile key, which may be the credit card number utilized to make the transactions from which the corresponding profile aggregation data is derived. The profile data columns may include a column storing the time periods for each respective row of corresponding profile aggregation data. In this example, the profile aggregation data represents the entity activity in time units of activity per month, such that the first row is the profile aggregation data for the specific entity associated with the profile key for January 2019 and the second row is the profile aggregation data for that entity for February 2019. The bucket date in the time period column may be truncated according to the time unit. Here, for example, the time period is monthly, so the bucket date is truncated to hold the first date of each month at 12:00 AM.

In the above example, the at least one column for storing the profile aggregation include columns for the count ("Ct") (e.g., the amount of transactions utilize to derive the rest of the profile aggregation data), sum of transactions, minimum transaction amount("Min"), maximum transaction amount ("Max"), and an average transaction amount ("Avg") columns. The last-update time and last-update day columns have been discussed elsewhere herein.

Figure 2:
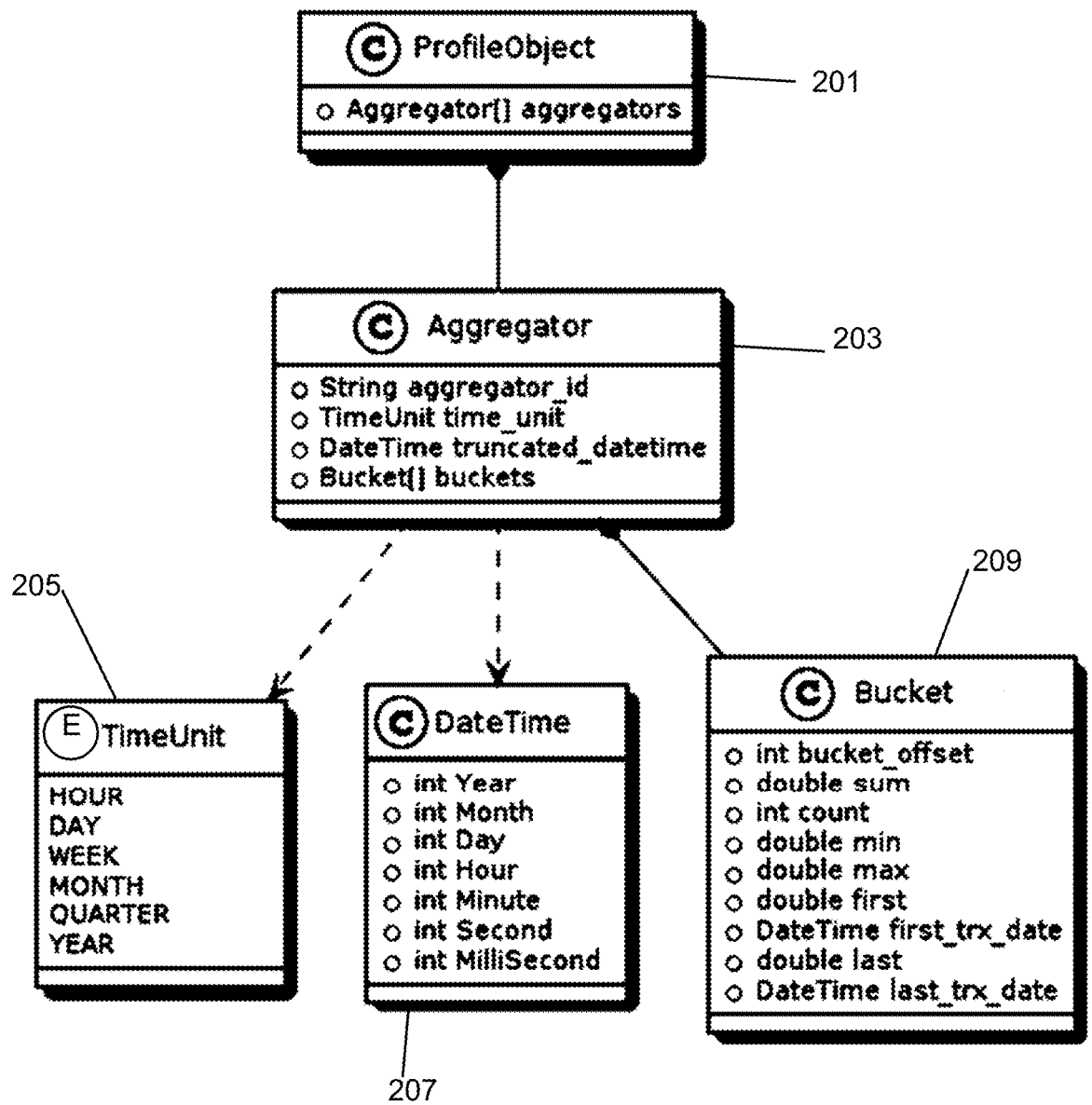
FIG. 2 is a class diagram of a profile object structure, according to embodiments of the present invention.

Reference is made to FIG. 2, which is a class diagram of a profile object structure, according to embodiments of the present invention.

A profile object structure may include a ProfileObject 201, which may be the top-level construct of the profile. A ProfileObject 201 may be a class according to Unified Modeling Language ("UML"). A class may be a user defined type or data structure declared with the keyword class. A ProfileObject 201 may contain an array of profile aggregators 203. Each of the profile aggregators 203 may have an aggregation_id of type String used to identify what type of profile aggregation data 203 it is. For example, example types of profile aggregation data 203 may be a sum of transactions, it may be an average of transactions, it may be a minimum transactional amount, or it may be a maximum transactional amount. A profile aggregator 203 may maintain an array of buckets 209 of calculated statistics for a certain time unit, such as a total sum of all transactions for an entity for a certain month. The profile aggregator 203 and the buckets 209 may be classes. A device such as a computer 100 of FIG. 1A may execute, include or be the profile aggregator 203.

A profile object structure may include a truncated datetime field 207 of type DateTime, which represents an initial timestamp for the profile object that is truncated according to the time unit in the time unit construct 205. The DateTime 207 may be a class and the time unit construct 205 may be of enumeration type according to UML. In UML models, enumerations may be model elements in class diagrams that represent user-defined data types. Enumerations may contain sets of named identifiers that represent the values of the enumeration.

An array of buckets 209 may contain the profile aggregation data for an entity over a certain period of time. A period of time may be determined by the truncated datetime field in the profile aggregator 203 plus a bucket_offset. The bucket_offset may be a zero-based offset of the array of buckets 209 from the truncated datetime. For example, if the time unit is a month and the truncated timestamp in the parent profile aggregator 203 is 01.01.2019 00:00:00.000 and the bucket_offset is 2, then the bucket contains data for February 2019. Another example may be if a monthly bucket has a truncated datetime in the Aggregator 203 that is March 2019 and the bucket_offset is 2, this means that the bucket would contain data for May 2019.

A datetime construct 207 may represent a timestamp (e.g., the last time the profile was updated) for the profile. Each one of the date time components may be stored in, for example, as single integer. A time unit construct 205 may represent the time units supported in embodiments of the invention.

The profile update table 147 may include various columns, such as a column for storing information which can be used to identify the entity associated with the profile rows; a column for storing information that can be utilized to identify when the corresponding rows were lasted added to the table; and at least one column for storing all profile updates derived from the transactions that are sent to embodiments of the invention along with instructions or commands describing how the corresponding profile aggregation data needs be calculated to update the corresponding recent profile aggregation data in the profile table.

For example, if the profile table 145 includes a column for the amount of transactions utilized to derive the most recent profile aggregation data ("count"), a column for the total amount of dollars involved in the transactions utilized to derive the most recent profile aggregation data ("sum"), and a column for the average dollar amount for the transactions utilized to derive the most recent profile aggregation data ("count"), then the profile update table 147 may include a column containing the dollar amount of the incoming transaction and a command or instruction to increase the count in the profile table 145 by one ("new count"), add the dollar amount of the incoming transaction to the sum ("new sum"), and divide the new sum by the new count to get an updated average dollar amount. An example of the format of a profile update and its merging instructions is described in more detail with regards to the ProfileUpdateEntry construct 301 of FIG. 3, described elsewhere herein. While, as described elsewhere herein, in one example, data is organized into rows and columns, other methods of organizing data may be used.

In some embodiments of the invention, the column for storing information which can be used to identify the entity in the profile update table 147 may include a column for storing the profile-key which is associated with a particular entity. The profile-keys in the profile-key row may be derived from data from transactions that have been sent to the server 50 but have not been utilized to derive the most recent profile aggregation data yet. The profile table update table 147 may also include a profile ID column which is of type TEXT.

The at least one column for storing the profile updates in the profile update table 147 may include columns that correspond to the columns for storing the profile updates in the profile table 145. The at least one column for storing the most recent profile aggregation data in the profile update table may be in BLOB ("binary large object") format.

The profile update table 147 may include an insertion time stamp that indicates when the corresponding rows were created. The insertion timestamp may be of type TIMEUUID type. The insertion-timestamps may be determined by a coordinator node of a NoSQL Database (e.g., database 140 of FIG. 1). The coordinator node that is serving the INSERT request initiated from the client, generates a new unique timeuuid in milliseconds when the INSERT statement is executed. The INSERT statement may refer to the SQL statement used to insert the update row into the update table 147. An example of an INSERT statement may be:

INSERT INTO % s.AIS_PROFILE_UPDATE_TABLE (profile_key, profile_id, profile_update_data, transaction_timestamp, insertion_timestamp, update_ordinal) VALUES (:profile_key, :profile_id, :profile_update_data, :transaction_timestamp, :insertion_timestamp, :update_ordinal) USING TTL:using_ttl_arg_sec;

The timestamp portion of the timeuuid conforms to the universal time standard and is guaranteed to be unique. The timeuuid type can be used to store conflict-free timestamps. Timeuuid types may be entered as integers for SQL input, such as CQL input for the Cassandra database. Timeuuid types may include the time of its generation and may be sorted by timestamp. For example, it is possible to use the timeuuid type to identify a column by its timestamp and allow multiple clients to write to the same partition key simultaneously.

The profile update table 147 may also include an update ordinal column. The update-ordinal in the profile update row may be used for distinguishing between the update rows when a group of updates are inserted in a batch and all the updates in the group are getting the same insertion-timestamp. The update ordinal may be utilized for distinguishing between update rows when a group of updates are inserted in a batch and all the updates in the group are to get the same insertion-timestamp.

The insertion timestamp column and the update ordinal columns in the profile update table 147 may be used as clustering keys, sorted by descending order.

An example of structure for the profile update table 147 may be the following:

| Profile-key (TEXT PK) | Profile-ID (TEXT) | Profile-update-data (BLOB) | insertion-timestamp (TIMEUUID CK DESC) | Update-ordinal (INT CK DESC) |
| --- | --- | --- | --- | --- |

A primary key of the profile update table 147 may be a compound key which includes the profile key, the profile ID and the insertion timestamp.

Figure 3:
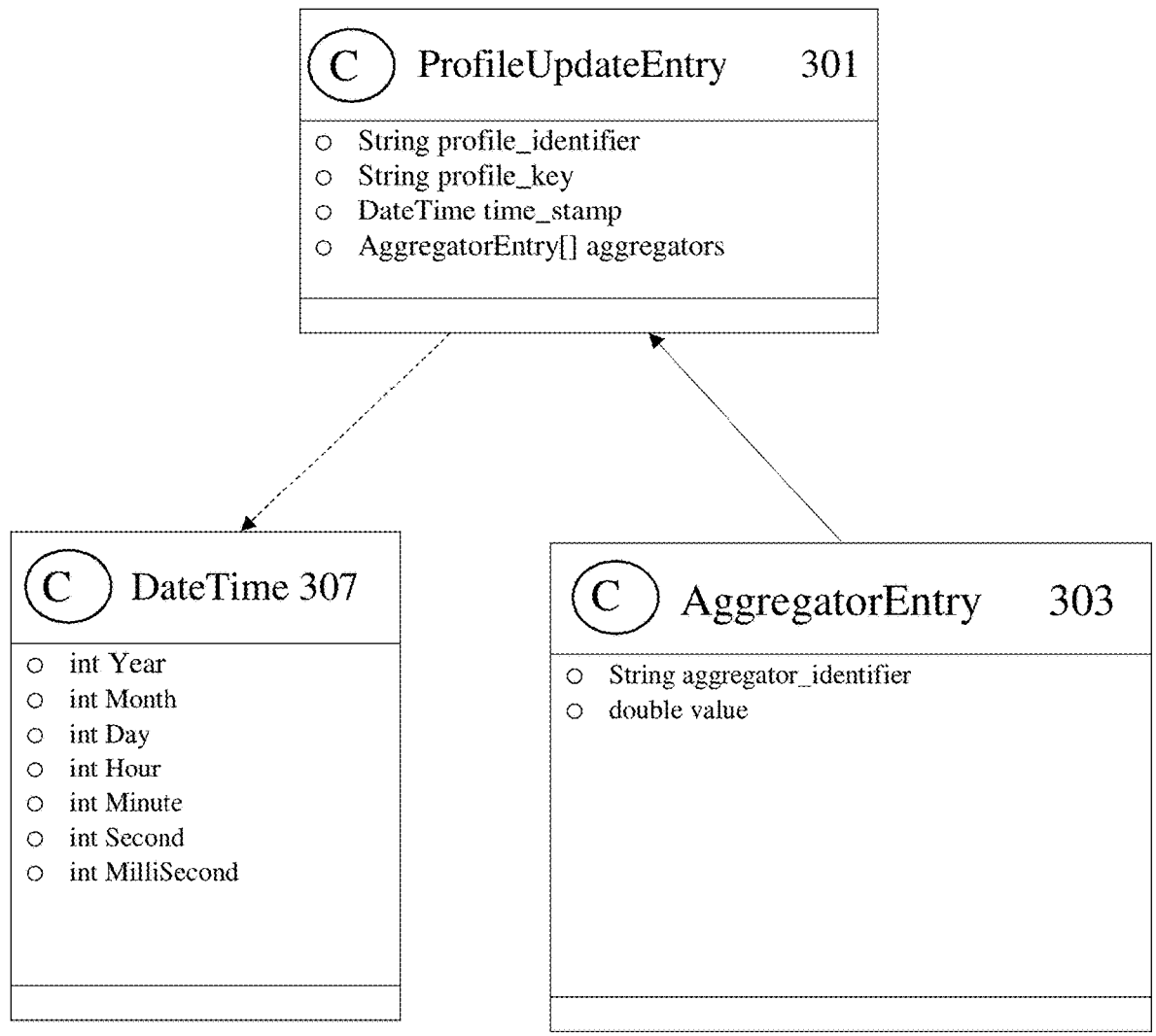
FIG. 3 is a class diagram of a profile update object structure, according to embodiments of the present invention.

Reference is made to FIG. 3, which is a class diagram of a profile update object structure, according to embodiments of the present invention. The profile update object may include a ProfileUpdateEntry construct 301. The ProfileUpdateEntry construct 301 may contain a profile identifier that identifies a profile definition in embodiments of the invention and a profile key that that identifies the entity. The profile definition may be a profile type associated with a profile ID. For example, a credit/debit card profile type has a different structure than a device profile type.

The combination of the profile key and the profile identifier uniquely identifies (in the context of a system according to an embodiment of the invention) the entity profile that needs to be updated. The ProfileUpdateEntry construct 301 may include a DateTime timestamp construct 307 which may represent the timestamp of the transaction from which the update is derived, and may determine which bucket to update.

The ProfileUpdateEntry construct 301 may include an Aggregator Entry construct 303. The Aggregator Entry construct 303 may hold a value and an aggregator identifier that may determine which bucket to update (e.g., in the profile object structure of FIG. 2) based on that value. Because embodiments of the invention may know the profile structure (e.g., what the statistical aggregators are and how the statistical aggregators are calculated using statistic functions), embodiments of the invention can determine what statistic functions are used for each aggregator identity. For example, if a user defined three aggregator time buckets in the profile, to be "Daily", "Monthly", and "DailyPerMonth", as shown in FIG. 10, each of those three aggregators would each have its own aggregator identity that may be auto-generated by embodiments of the invention. In each aggregator line for the aggregator time buckets, a user may have selected the statistic functions (e.g., a sum of all transactions, a minimum of all transactions, a maximum of all transactions, and an average value of all transactions, for the profile in the time period defined by aggregators) to calculate the profile aggregation data for the profile. The Aggregator Entry construct 303 may also hold the value extracted from the transaction data that is updated in the bucket (e.g., a payment amount value). The Aggregator Entry construct 303 may be in double-precision 64-bit IEEE 754 floating point value format. A device, such as a computer 100 of FIG. 1A, may execute, include or be the Aggregator Entry construct 303.

The DateTime construct 307 may have the same structure as discussed for the DateTime construct 207 of FIG. 2.

Both the profile table 145 and the profile update table 147 may use a partition key, meaning that a profile with a certain primary key value and its updates are saved and replicated in the same partitions across the NoSQL Database's cluster nodes. The primary key in a NoSQL database, such as the Cassandra database, may include a partition key and an optional clustering key. The partition key may be a combination of the profile key and profile ID in both the profile table and profile update table. The coordinator node may determine the node(s) that hold the profile and the profile updates for a particular partition key.

In some embodiments of the invention, the profile table and the profile update table are maintained in a NoSQL ("not only structured query language") database management system, such as the Apache Cassandra database. Both the profile table and the profile update table may use the same profile key so that a profile with a certain profile key value and its updates are saved and replicated in the same partitions across the NoSQL database management system's nodes.

In the first merging algorithm, the server 50 may be configured to, as part of performing a detection process on an incoming transaction for an entity, merge or combine the most recent profile updates derived from recent transactions for an entity that were sent to embodiments of the invention with the most recent profile aggregation extracted from the profile table. The most recent profile updates may include updates derived from the currently incoming transaction and may include other recent updates that have not yet been utilized to derive the most recent aggregation data. The server 50 may be configured to perform the first merging algorithm synchronously to determining whether the incoming transaction is fraudulent or is part of a money laundering attempt, or synchronously to performing risk management. The most recent update or data may be for example the update or data (e.g. most recent profile aggregation data) with or associated with a timestamp that is the latest in time, or the most recent (compared to the present) in time.

One or more user computers 175 may transmit incoming transactions to the server 50 and/or the database 140 via network 150 so that embodiments of the invention can determine if the incoming transactions are fraudulent or are part of a money laundering attempt, or to determine anything else necessary to prevent a transaction from being finalized. The one or more user computers 175 may be one or more processors, such as processor 100 of FIG. 1A. The incoming transaction may be, for example, a money transfer, a request to withdraw from or deposit money into an account, or an attempt to access or change an account. In other applications, computers 175 may transmit other data requiring storage and analysis.

In the first merging algorithm, the server 50 may be configured to derive at least one profile update from the current incoming transaction and store that profile update in a the profile update table 147 along with a set of commands or instructions describing how the statistic aggregators of the profile aggregation data need to be calculated to merge the profile update data with the most recent profile aggregation data for that entity in the profile table 145.

For example, the profile table 145 may include a column for the amount of transactions utilized to derive the most recent profile aggregation data (e.g., "count"), a column for the total amount of dollars involved in the transactions utilized to derive the most recent profile aggregation data (e.g., "sum"), and a column for the average dollar amount for the transactions utilized to derive the most recent profile aggregation data (e.g., "count"). The server 50 may derive the profile update by extracting the dollar amount of the incoming transaction. The server 50 may derive the merging instructions based on the columns of profile aggregation data in the profile table 145. For example, the server 50 may generate a command or instruction to increase the count in the profile table by one (e.g., "new count"), add the dollar amount of the incoming transaction to the sum (e.g., "new sum"), and divide the new sum by the new count to get an updated average dollar amount. Each row in the profile table may include profile updates, associated with a certain entity of the plurality of entities, along with merging commands/instructions.

In some embodiments of the invention, as part of the analysis or the detection process, the server 50 may write the profile update data generated from the incoming transaction together with a set of commands or instructions describing how the statistic aggregators of the profile aggregation data need to be calculated directly into the profile update table 147. The insertion-timestamp value in the profile update row may be determined by the NoSQL database management system coordinator using a now ( ) CQL function. The update-ordinal in the profile update row may be used for distinguishing between the update rows when a group of updates are inserted in a batch and all the updates it the group are getting the same insertion-timestamp.

In the first merging algorithm, in addition to the server 50 merging the profile update derived from the current incoming transaction with the most recent profile aggregation data, embodiments of the invention may also merge any other previous updates for the same entity that have not been merged with the most recent profile aggregation data yet.

For example, the server 50 may have previously derived at least one recent profile update, which has not been utilized to update a profile row in the profile table 145 for its corresponding entity yet, from at least one previous incoming transaction; and the database 140 may have stored that profile update in the profile update table 147. The server 50 may look for each row in the profile update table 147 that has the same profile-key as the current incoming transaction. Embodiments of the invention may then extract only the data from the rows which have an insertion timestamp value which is greater than last update insertion timestamp found in the most recent profile row in the profile table 145 that has the same profile-key. If there are no profile rows for the entity yet, then all profile update rows corresponding to the entity (e.g., having the same profile key as the profile key derived from the incoming transaction) are retrieved by the server 50.

The server 50 may retrieve the most recent profile aggregation data for the entity associated with the incoming transaction from a most recent profile row, which corresponds to an entity corresponding to the incoming transaction, of the profile table 145. The server 50 may utilize the profile key derived from the transaction to locate the corresponding profile row(s) corresponding to the entity associated with the profile key. The server 50 may determine which of the profile rows for the entity is the most recent by using the date in the last-update-day column in the profile rows.

If there are no profile rows for the entity yet, the server 50 may utilize an empty profile row for the most recent profile aggregation data.

The server 50 may then merge all profile updates corresponding to the entity, including the profile update derived from the incoming transaction, which were not utilized to derive the most recent profile row.

The server 50 may then derive up-to-date profile aggregation data from the most recent profile aggregation data for the entity retrieved form the profile table 145 and the profile updates retrieved from the profile update table 147. The server 50 may store the most recent profile aggregation data in the memory 120. It may be much faster for the server 50 to calculate and store the most recent profile aggregation data and perform aggregation of the updates to that most recent profile aggregation data in memory 120 rather than retrieve it again from the database 140.

The server 50 may perform analysis of data. For example, in the context of transactions, real-time analytics detection on an incoming transaction associated with the entity may be executed to perform a detection process to detect if the incoming transaction is fraudulent or is part of a money laundering attempt by utilizing the up-to-date profile aggregation data.

After generating the profile update data generated from the incoming transaction, the server 50 may transmit an event message to the database 140 to initiate the second asynchronous merging algorithm. The event message may include a re-calculation trigger which includes the primary key. In some embodiments of the invention, the re-calculation trigger only contains the profile key and profile ID for the update. The re-calculation trigger may be sent, with a delayed delivery attribute, to a message queue in the server 50, and each re-calculation trigger in the message queue may be configured to instruct the server 50 to update or determine whether to update the corresponding most recent profile aggregation data in the profile table 145 based on the profile update row(s) corresponding to the re-calculation trigger(s). The delay time for the delayed delivery attribute may be determined by or may be the synchronization period.

In the second merging algorithm, the server 50 may be configured to, starting with an earliest re-calculation trigger in the message queue, retrieve the most recent profile row from the profile table 145 for the corresponding entity (e.g., the row having the same primary key as in the re-calculation trigger and having a most recent last update insertion timestamp).

The server 50 may be configured to retrieve all the update rows in the profile update table 147 which have an insertion timestamp value that is greater than the last-update insertion timestamp taken from the most recent profile row for the entity that was extracted from the profile table 145 minus a synchronization period. As discussed elsewhere herein the synchronization period may be in the order of milliseconds and may be larger than a maximum potential time difference between different clocks in different nodes of embodiments of the invention (e.g., different clocks of the server 50).

The server 50 may be configured to derive up-to-date profile aggregation data from the most recent profile aggregation data for the entity retrieved from the profile table 145 and the profile updates retrieved from the profile update table 147. The server 50 may be configured to save a new profile row, which includes the derived up-to-date profile aggregation data along with a timestamp for the time and date that the new profile row of the update, in the profile table 147 The last-update-insertion timestamp of the new profile row may be the last insertion timestamp of the most recent profile update retrieved from the profile update table 147 recent (e.g., the profile update having the latest insertion-timestamp). The server 50 may be configured to not write a derived profile row to the profile table 147, if the profile table 147 contains a profile row for that same entity that has a last-update-insertion timestamp which is more recent than the last-update-insertion-timestamp of the derived profile row. The row insertion statement may use a USING TIMESTAMP [MICROSECONDS] constraint which prevents attempts to overwrite a profile with up-to-date or newer updates from being overwritten by a profile row with outdated or older updates. While in example embodiments the data stored is profile data, other data may be stored, merged, analyzed, etc.

Figure 4:
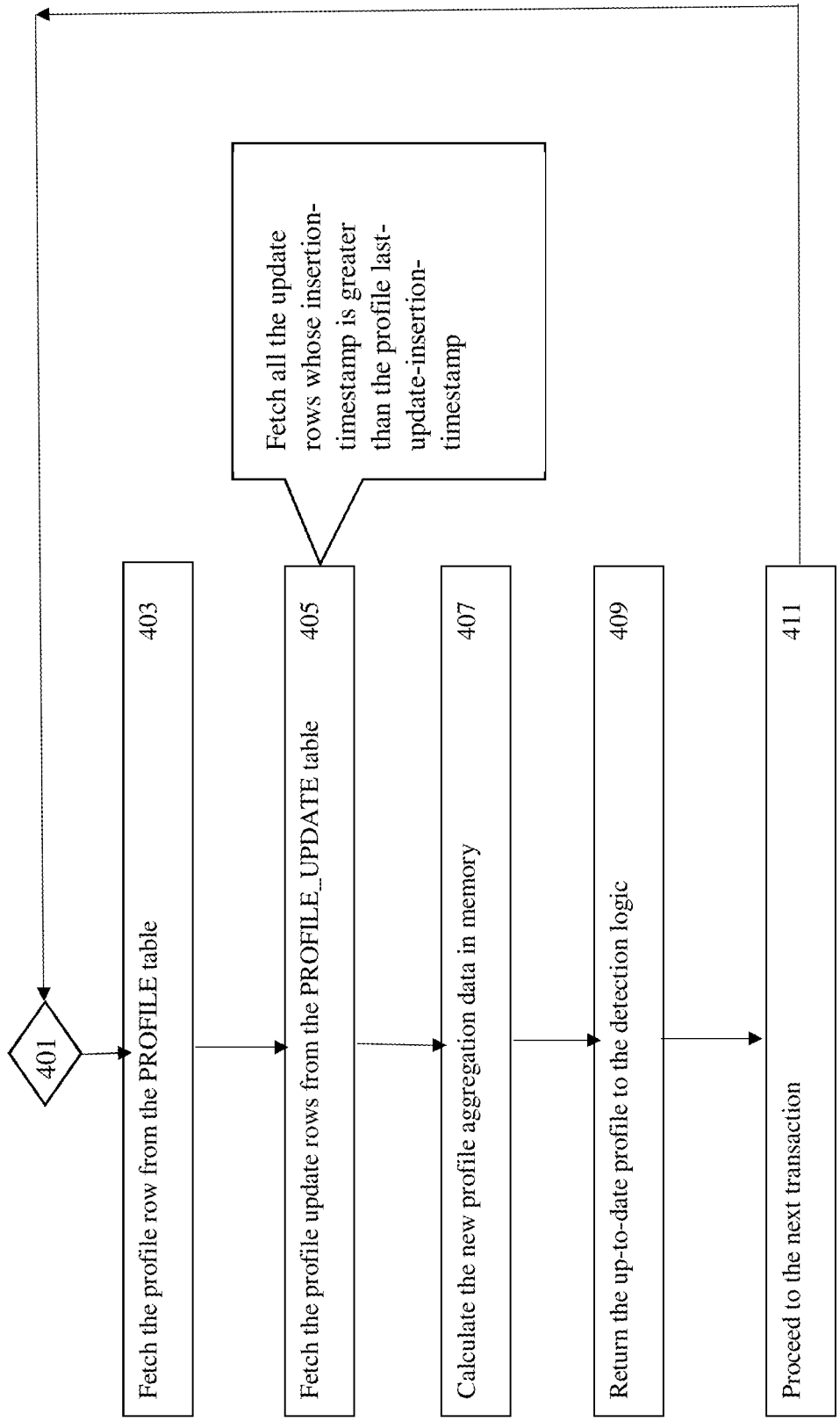
FIG. 4 is a flowchart of a first synchronous merging algorithm, according to embodiments of the present invention.

Reference is made to FIG. 4, which is a flowchart of the first merging algorithm, according to embodiments of the present invention. The first synchronous merging algorithm may start 401 when a profile is requested when performing the detection process (e.g., when the server 50 of FIG. 1B is determining whether the current incoming transaction is fraudulent or is part of a money laundering attempt, or when performing risk management). Operations 401-411 may be performed by a server (e.g., the server 50 of FIG. 1B).

In operation 403, the server may retrieve a most recent profile row or other storage container or location associated with an entity associated with the current incoming transaction from a profile table (e.g., the profile table 145 of FIG. 1B). For example, the server may fetch a profile row that has the same profile key as a profile key derived from the current incoming transaction which has the most recent date in a last-update-day column. The current incoming transaction may be the transaction which is currently being analyzed to determine if the transaction is valid, should be blocked, or if an alert should be generated. While in example embodiments, rows are used for the location of a data item and columns are used for divisions of different data types, in other embodiments, different ways of organizing location of different data items and data types may be used.

In operation 405, the server may retrieve each profile update row from a profile update table (e.g., the profile update table 147 of FIG. 1) which has an insertion-timestamp which is greater than (e.g., later than) the profile last-update-insertion-timestamp located in the profile row extracted from the profile table.

In operation 407, the server may calculate an up-to-date profile aggregation data and save it in a memory (e.g., the memory 120 of FIG. 1) based on the profile row extracted from the profile table and the profile update row extracted from the profile update table. As discussed elsewhere herein, the profile update row also includes instructions for how to update the profile row based on the profile update in the profile update row.

In operation 409, a data analysis may be performed. E.g., the server may return the up-to-date profile aggregation data to detection logic for determining whether the incoming transaction is valid, should be blocked, or if an alert should be generated.

In operation 411, the one or more processors may proceed to a next incoming transaction that is received. While in embodiments described herein, a specific example system (e.g. FIG. 1B) is described, other specific systems may be used.

Figure 5:
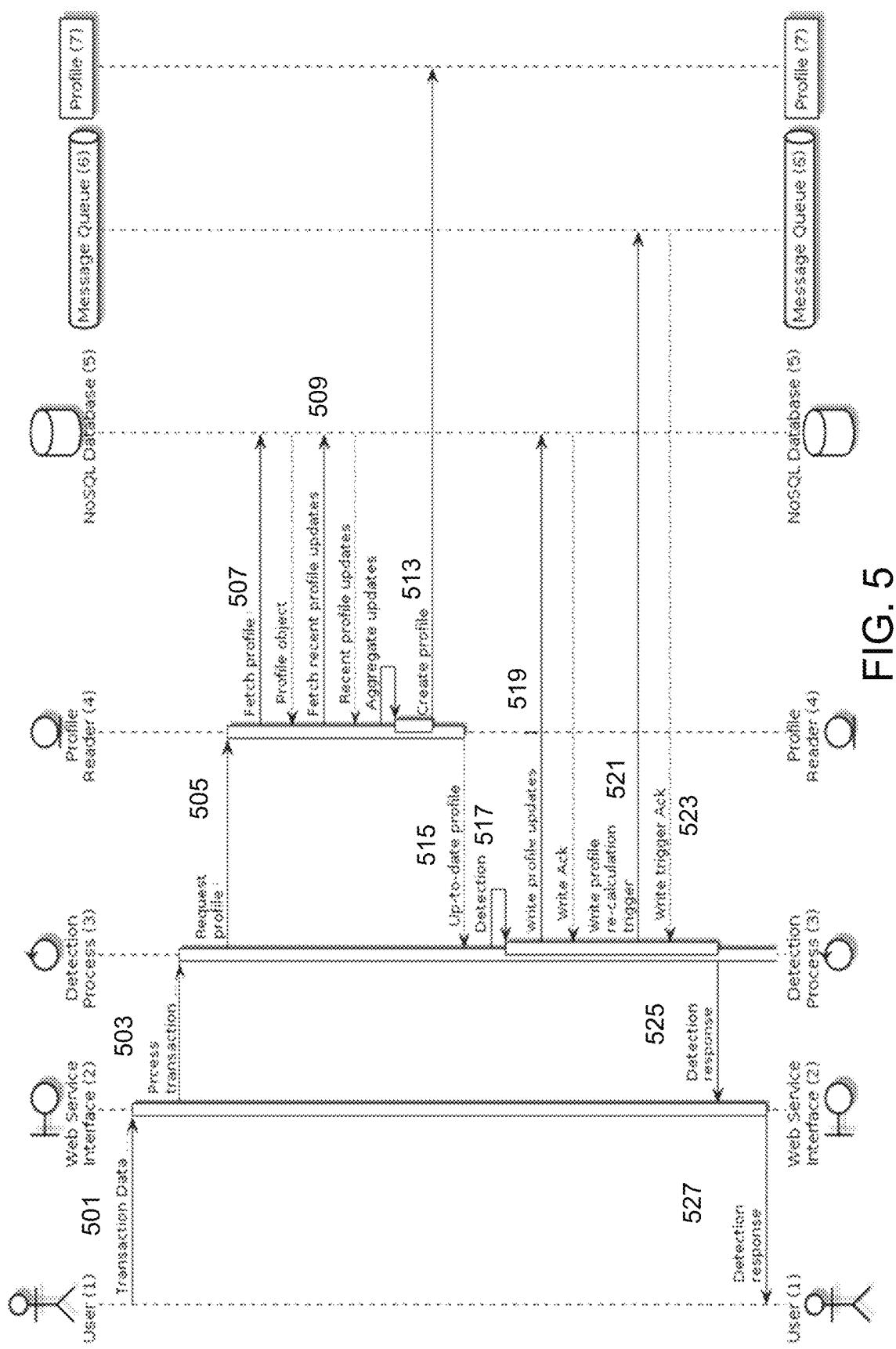
FIG. 5 is a flow chart of a first synchronous merging algorithm, according to embodiments of the present invention.

Reference is made to FIG. 5, which is a second flow chart of a first synchronous merging algorithm, according to embodiments of the present invention. Operations 501-527 may be performed by server (e.g., the server 50 of FIG. 1B, but other systems may be used).

In operation 501, a web service interface 2 of the server may receive data, such as transaction data from an external user 1 (e.g., from the one or more user computers 175 of FIG. 1). In operation 503, the web service interface 2 may transmit the transaction data to a detection process 3 of the server. In operation 505, the detection process 3 may detect an entity that corresponds to the transaction data based on a profile key extracted from the transaction, and may collect information on the detected entity. The detection process 3 may enrich the transaction data before it performs detection logic. For example, once a transaction, such as a payment transaction, of an entity reaches embodiments of the invention, the detection process 3 may enrich the transaction with additional information before performing the detection logic. For example, as part of the enrichment process, there may be a need to translate IP addresses to the physical geographical addresses of the payer and the payee. After all the relevant entities involved in the transaction are identified, their profiles can be loaded. For example, as part of a detection process preparation phase, eight profiles may be loaded. When the profiles are loaded, for each loaded profile, embodiments of the invention may load its recent updates and aggregate them into the profile. In this way, the detection logic in the next stage of the process will be able to use up to date profiles.

In operation 505, the detection process 3 may request the entity's profiles from the profile reader 4 based on a profile-key and a profile ID derived from the transaction. In operation 507, the profile reader 4 may retrieve the most recent profile row from a profile table (e.g., the profile table 145 of FIG. 1B) in a NoSQL Database 5 (e.g., the database 140 of FIG. 1) by using the profile-key and profile-ID. If no such profile exists, embodiments of the invention may utilize an empty profile.

In operation 509, the profile reader 4 may retrieve all the update rows for the entity from a profile update table (e.g., the profile update table 147 of FIG. 1) which have an insertion-timestamp value that is greater than the last-update-insertion-timestamp taken from the profile row retrieved from the profile table.

In operation 513, the profile reader 4 may calculate up-to-date profile aggregation data based on the profile data and profile update data retrieved in operations 507 and 509, respectively. As described elsewhere herein, the profile update may have been saved along with instructions for how to update the profile data based on the profile update. In operation 515, the profile reader 4 may transmit the up-to-date profile aggregation data to the detection process 3. In operation 517, the detection process 3 may perform the detection logic using the up-to-date profile from operation 515.

In operation 519, the detection process may create a new profile update message, which includes profile update data derived from the incoming transaction values. In operation 521, the detection process may transmit a profile re-calculation trigger to a message queue 6 of the NoSQL Database 5. In operation 523, the NoSQL Database 5 may transmit an acknowledgment of receipt of the re-calculation trigger to the detection process 3.

In operation 525, the detection process 3 may transmit a response based on the detection performed in operation 517 to the web service interface 2, which may transmit, in operation 527, the response to the user 1.

Figure 6:
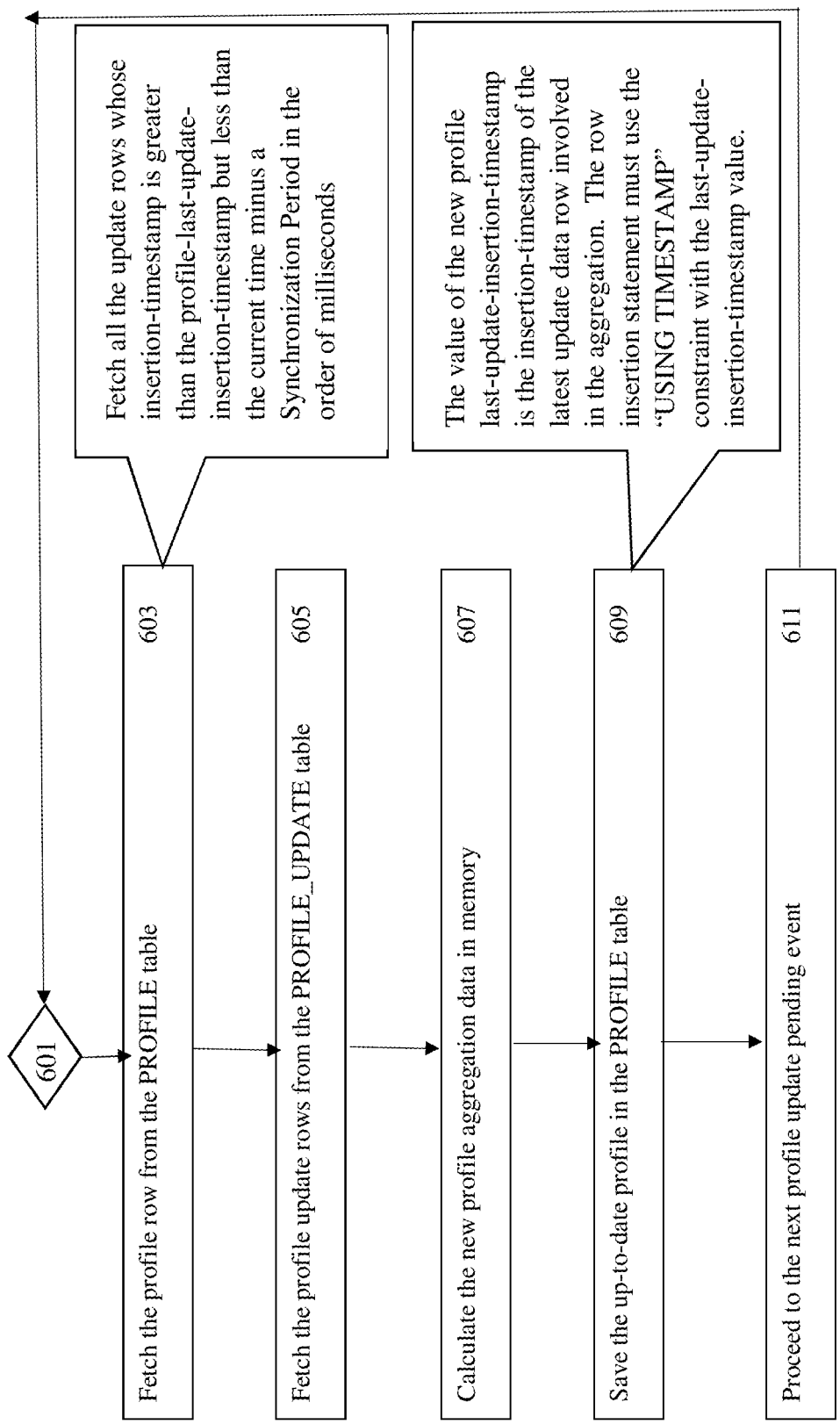
FIG. 6 is a flowchart of a second asynchronous merging algorithm, according to embodiments of the present invention.

Reference is made to FIG. 6, which is a flowchart of the second asynchronous merging algorithm, according to embodiments of the present invention. The second merging algorithm may be utilized to asynchronously update profile aggregation data. The second merging algorithm may start 601 for a specific update when a re-calculation trigger for that update is at the top of a message queue. Operations 601-611 may be performed by server (e.g., the server 50 of FIG. 1B).

In operation 603, the server may retrieve a most recent profile row associated with an entity associated with the current incoming transaction from a profile table (e.g., the profile table 145 of FIG. 1B). For example, the server may fetch a profile row that has the same profile key as a profile key derived from the current incoming transaction which has the most recent the date in a last-update-day column.

In operation 605, the server may retrieve each profile update row from a profile update table (e.g., the profile update table 147 of FIG. 1) which has an insertion-timestamp which is greater than the profile last-update-insertion-timestamp located in the profile row extracted from the profile table but less than the current time minus a synchronization period in the order of milliseconds.

In operation 607, the server may calculate up-to-date profile aggregation data based on the profile row extracted from the profile table and the profile update row extracted from the profile update table. In other words, the up-to-date profile aggregation data is based in part on the current incoming transaction data.

In operation 609, the server may store the up-to-date profile aggregation data to the profile table. The up-to-date profile aggregation data may be given a last-update-insertion-timestamp which is the same as insertion-timestamp of the latest update data row utilized to perform operation 607.

In operation 611, the one or more processors may proceed to start the same process for the next profile update which corresponds to the next re-calculation trigger in the message queue.

Figure 7:
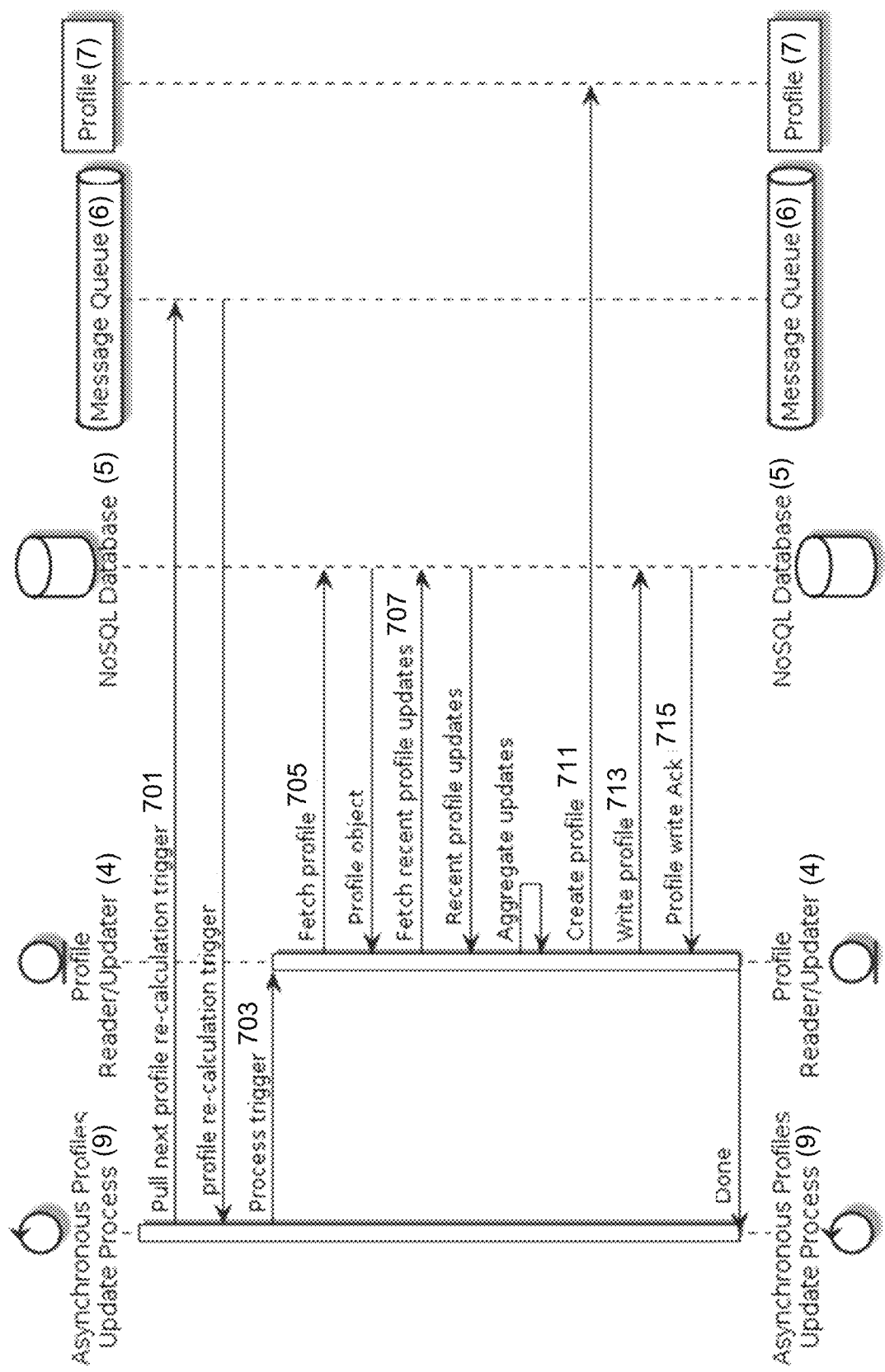
FIG. 7 is a second flowchart of a second asynchronous merging algorithm, according to embodiments of the present invention.

Reference is made to FIG. 7, which is a second flowchart of a second asynchronous merging algorithm, according to embodiments of the present invention. Operations 701-715 may be performed by server (e.g., the server 50 of FIG. 1B).

In operation 701, an asynchronous profiles update process 9 of the server may retrieve a next pending profile re-calculation trigger from the message queue 6. The re-calculation trigger may include the profile-key and the profile-ID.

In operation 703, a profile reader/updater 4 of the server may process the trigger and retrieve the most recent profile row from a profile table (e.g., the profile table 145 of FIG. 1B) using the profile key and profile ID from the re-calculation trigger. If no such profile exists, embodiments of the invention utilizes an empty profile.

In operation 707, the profile reader/updater 4 may retrieve all the update rows, from a profile update table (e.g., the profile update table 147) that have the same profile key and profile ID that are included in the re-calculation trigger, and which have an insertion-timestamp value that is greater than the last-update-insertion-timestamp of the profile row retrieved in operation 705, but less than the current time in the coordinator node minus a synchronization period of X milliseconds.

In operation 711, the profile reader/updater 4 of the server may calculate an up-to-date profile aggregation data and based on the profile row extracted from the profile table and the profile update row extracted from the profile update table.

In operation 713, the profile reader/updater 4 may store the up-to-date profile aggregation data to the profile table. The up-to-date profile aggregation data may be given a last-update-insertion-timestamp which is the same as insertion-timestamp of the latest update data row utilized to perform operation 707. The last-update-insertion timestamp of the new profile row may be the last insertion timestamp of the most recent profile update retrieved from the profile update table 147 (e.g., the profile update having the latest insertion-timestamp). The server 50 may be configured to not write a derived profile row to the profile table 147, if the profile table 147 contains a profile row for that same entity that has a last-update-insertion timestamp which is more recent than the last-update-insertion-timestamp of the derived profile row. The row insertion statement may use a USING TIMESTAMP [MICROSECONDS] constraint which prevents attempts to overwrite a profile with up-to-date or newer updates from being overwritten by a profile row with outdated or older updates.

In operation 715, the NoSQL Database 5 may provide the profile reader/updater 4 with an acknowledgment of the profile write, and afterword the Profile Reader/Updater 4 may return control back to the Asynchronous Profiles Update Process which may continue pulling or retrieving pending triggers from the Message Queue.

Figure 8:
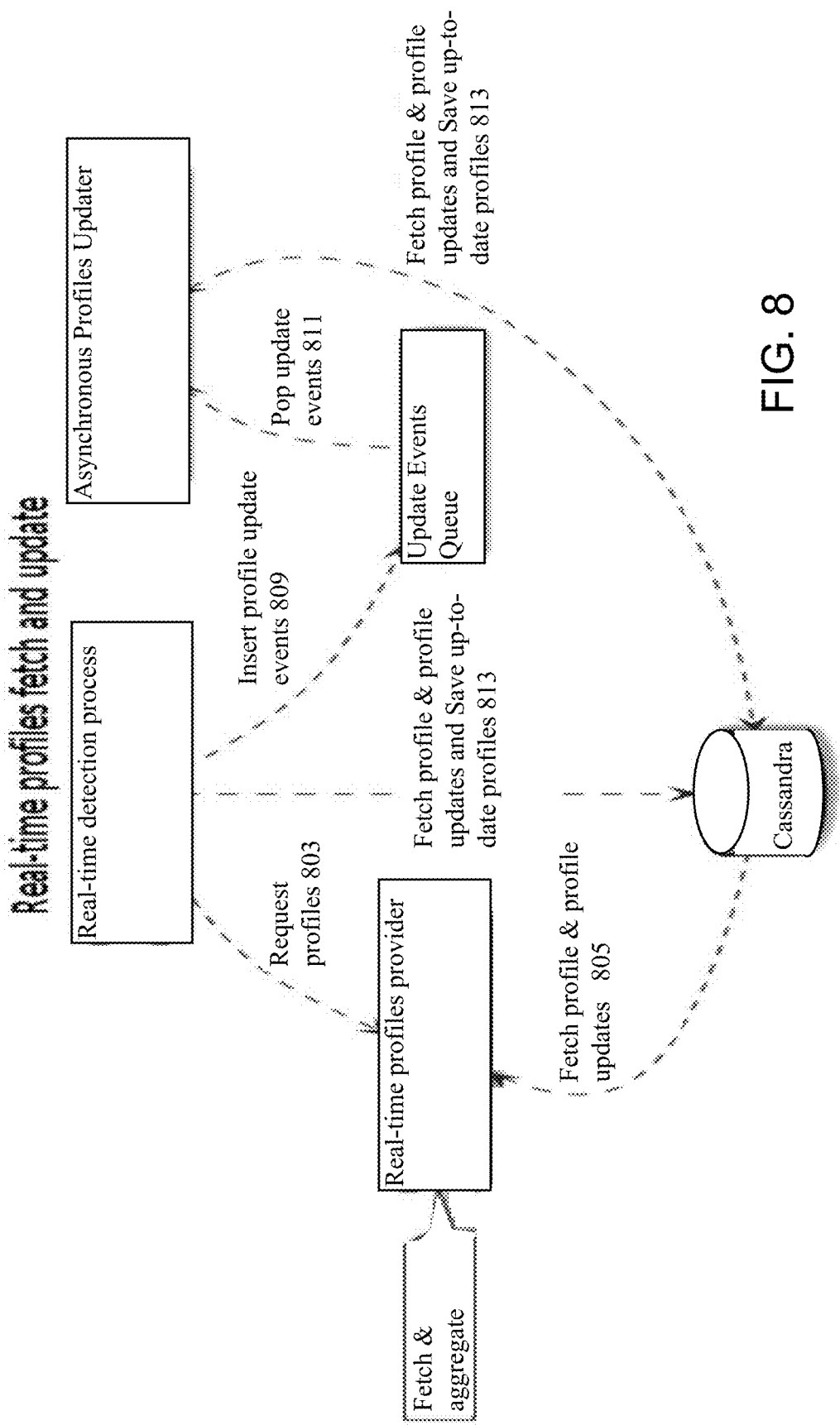
FIG. 8 is a flow chart of the first and second merging algorithms, according to embodiments of the invention.

Reference is made to FIG. 8, which is a flowchart of the first and second merging algorithms, according to embodiments of the invention. Operations 801-813 may be performed by a server (e.g., the server 50 of FIG. 1B).

In operation 803, a real-time detection process (e.g., detection process 3 of FIGS. 5 and 7) of the server may request a most recent profile row associated with an entity associated with a current incoming transaction from a profile table (e.g., the profile table 145 of FIG. 1B). In operation 805, a real-time profiles provider of the server may retrieve a most recent profile row associated with an entity associated with the current incoming transaction from the profile table and may retrieve each profile update row from a profile update table (e.g., the profile update table 147 of FIG. 1) which has an insertion-timestamp which is greater than the profile last-update-insertion-timestamp located in the profile row extracted from the profile table.

In operation 807, the real-time detection process may calculate up-to-date profile aggregation data based on the profile row extracted from the profile table and the profile update row extracted from the profile update table; and may write the profile update to a memory (e.g., the memory 120 of FIG. 1) in a NoSQL database, such as the Cassandra database.

In operation 809, the real-time detection process may insert profile update events, such as a re-calculation trigger, into an update events queue (e.g., the message queue 6). In operation 811, an asynchronous profile updater (e.g., asynchronous profiles update process 9 of FIG. 7) of the server may pull or retrieve a next pending profile re-calculation trigger from the update events queue.

In operation 813, the asynchronous profiles updater may retrieve the most recent profile row from a profile table (e.g., the profile table 145 of FIG. 1B) using the profile key and profile ID from the re-calculation trigger. In operation 813, asynchronous profiles updater may retrieve all the update rows, from a profile update table (e.g., the profile update table 147) that have the same profile key and profile ID that are included in the re-calculation trigger, and which have an insertion-timestamp value that is greater than the last-update-insertion-timestamp of the profile row retrieved in operation 705, but less than the current time in the coordinator node minus a synchronization period in the order of milliseconds. For example, a synchronization period of 2000 milliseconds may be used. In operation 813, the asynchronous profiles updater may calculate an up-to-date profile aggregation data and based on the profile row extracted from the profile table and the profile update row extracted from the profile update table. In operation 813, the asynchronous profiles updater may store the up-to-date profile aggregation data to the profile table.

Figure 9:
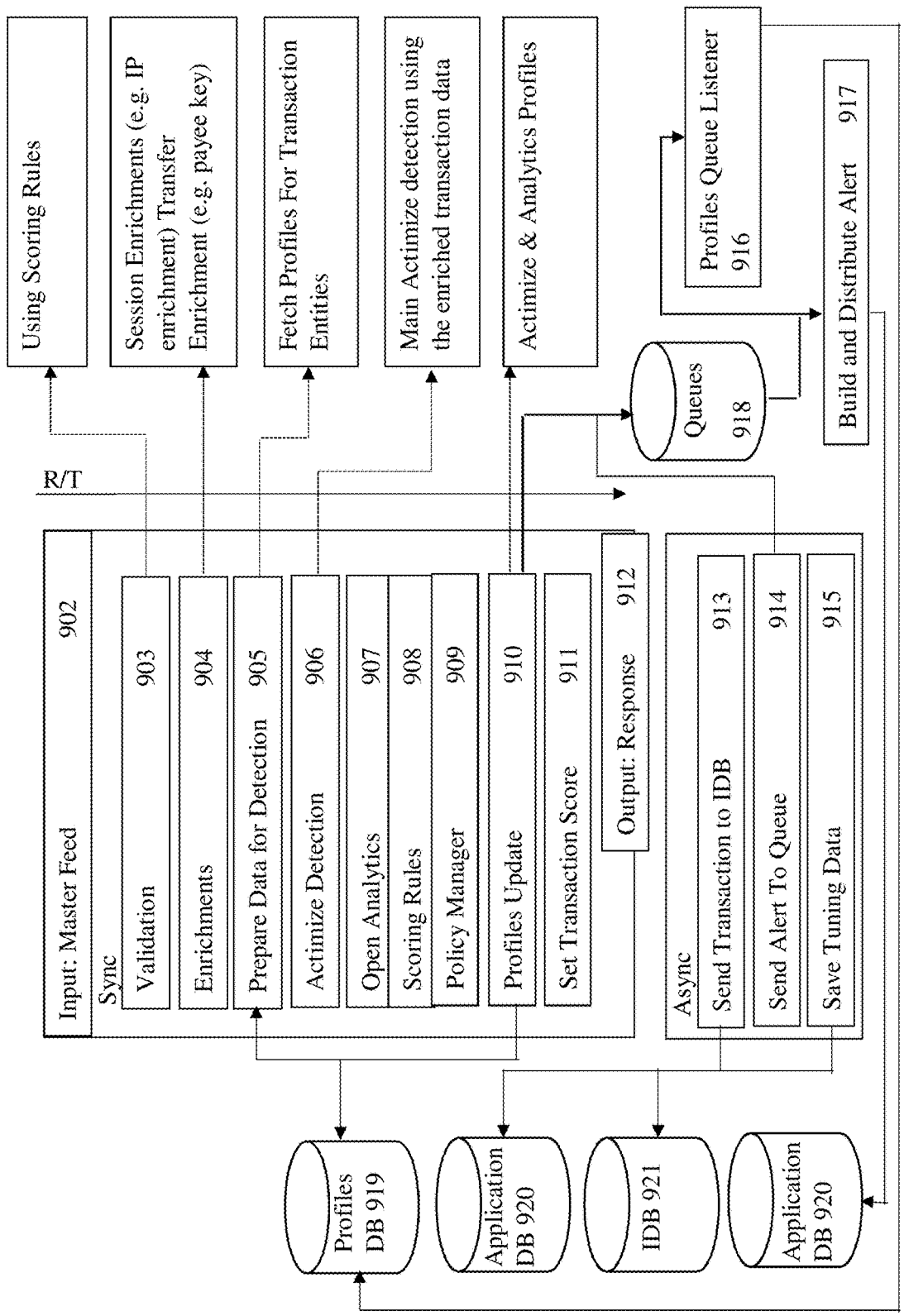
FIG. 9 is a block diagram depicting where and how the synchronously updated profile aggregation data is used in an integrated fraud management platform solution ("IFM").

Reference is made to FIG. 9, which is a block diagram depicting where and how the synchronously updated profile aggregation data (e.g., the up-to-date profile aggregation data stored in memory 120) is used in an integrated fraud management platform solution ("IFM").

The transaction data 901 extracted from an incoming transaction by a server (e.g., the server 50 of FIG. 1B) may be transmitted to a master feed 902 of a detection process (e.g., detection process 3 of FIG. 5) of the server. The server may validate the transaction data 901 at a validation module 3 of the server by utilizing scoring rules to compute an initial score from the raw transaction data before enrichment. For example, the validation module 3 may determine if a credit card utilized for a transaction is in a valid format.

The one more processors may enrich the transaction data 901 that has been validated in an enrichment module 904 before performing detection logic. More specifically, once a transaction, such as a payment transaction, of an entity reaches embodiments of the invention, the detection process enriches the transaction with additional information before performing the detection logic. For example, as part of the enrichment process, there may be a need to translate IP addresses to the physical geographical addresses of the payer and the payee. After all the relevant entities involved in the transaction are identified, their profiles can be loaded. For example, as part of a detection process preparation phase, eight (for example) profiles may be loaded, and, for each loaded profile, embodiments of the invention may load its recent updates and aggregate them into the profile. In this way, the detection logic in the next stage of the process will be able to use up to date profiles.

The server may send the enriched transaction data to a preparation module 905 of the server to prepare the enriched transaction data for the detection logic.

The synchronous merging and detection method described elsewhere herein may be performed by a validation module 903, an enrichment module 904, a preparation module 905, a detection module 906, an open analytics module 907, and scoring rules module 908, a policy manager module 909, a profiles update module 910, a transaction score module 911, and a response module 912 of a server (e.g., server 50 of FIG. 1B).

The preparation module 905 may detect an entity that corresponds to the enriched transaction data and may collect information on the detected entity. The preparation module 905 may derive profile update data from the enriched transaction data 901.

The preparation module 905 may request the entity's profiles from the profiles database 919 based on a profile-key and a profile ID derived from the transaction data 901. The preparation module 905 may retrieve the most recent profile row from a profile table (e.g., the profile table 145 of FIG. 1B) in a profiles database 919 (e.g., database 140 of FIG. 1B) by using the profile-key and profile-ID. If no such profile exists, embodiments of the invention may utilize an empty profile.

The preparation module 905 may retrieve all the update rows for the entity from a profile update table (e.g., the profile update table 147 of FIG. 1B) in the profile database 919 which have an insertion-timestamp value that is greater than the last-update-insertion-timestamp taken from the profile row retrieved from the profile table. The preparation module 905 may calculate up-to-date profile aggregation data based on the retrieved profile row and profile update row(s).

The preparation module 905 may transmit the up-to-date profile aggregation data to a detection module 906. The detection module 906 may perform the detection logic using the up-to-date profile aggregation data. The open analytics module 907 may provide an infrastructure or an exit point to a user so that the user can insert their own custom scoring model that accepts context fields derived from the enriched transaction data and returns a score. The scoring rule module 908 may accept rules context fields derived from the enriched transaction data and may allow users to execute custom scoring rules. The rules may be predefined and may be created by the user by utilizing a graphical user interface ("GUI"), such as the Actimize Visual Modeler GUI application. A single rule may be a predicate function consisting of an expression that can use the input context fields. A set of rules may be defined (e.g., by a professional service and/or a user of the professional services) to return a certain score if all the rules results are true. The policy manager module 909 may allow users to define their own rules that will be executed as part of the detection performed by the detection module 906. A graphical user interface ("GUI"), such as the Actimize Visual Modeler GUI, may provide a web user interface which may allow users to define the rules and their expressions. Unlike the scoring rules, the rules generated by the policy manager module 909 may be defined to produce an action. For example, a rule can be defined to send an alert once its expression result was evaluated to be true.

A profiles update module 910 may store the derived profile update data and a set of commands or instructions describing how the statistic aggregators of the profile aggregation data need to be calculated directly into a profile update row of the profile update table in the profiles database 919. Thus, the profile updates are available for processing a next consecutive incoming transaction. The profiles update module 910 may transmit a profile re-calculation trigger to a message queue 918. The profiles queue listener 916 may retrieve these triggers and perform the asynchronous merging algorithm, as described elsewhere herein. For each trigger, the profiles queue listener 916 may retrieve the profile and its updates, aggregate the updates into the profile in memory (e.g., memory 120 of FIG. 1) and save the up-to-date profile in the profiles database 919.

The score from the open analytics module 907 may be combined with the transaction score derived by the transaction score module 911 to produce a final score, which can be used to determine a response to the incoming transaction (e.g., block, allow, or generate an alert). For example, a set of rules configured in the open analytics module 907 by a professional service are weighted at 50%, a set of rules configured in the open analytics module 907 by a customer of the professional service is weighted at 25%, and the set of rules for the transaction score module 911 are weighted at 25%. In such a scenario, if the score from the open analytics module 907 for the professional service's rules and the customer's rules are 70 and 40, respectively, and the score from the transaction score module 911 is 90, then the final detection score would be 67.5 [(0.5×70)+(40×0.25)+(90×0.25)].

The response module 912 may perform a detection process which determines whether the incoming transaction is valid, should be blocked, or if an alert should be generated based on a score generated by the detection module 906 and a final transaction score set by the transaction score module 911. For example, the final detection score may be compared against at least one predetermined threshold to determine what action to take if the final detection score is above or below the at least one predetermined threshold.

The asynchronous merging algorithm described elsewhere herein may be performed by a send transaction to an Integrated Database ("IDB") module 913, a send alert to queue module 14, and a save tuning data module 915 of the server.

The send transaction to IDB module 913 may send the transaction data 901 to an IDB 921. The IDB module 913 may store all the enriched transaction data. A customer can use the enriched transaction data to investigate and check all the transactions for a certain entity or entities that were processed when an alert was generated due to a suspicious activity. The alerts database 922 may store all alerts generated by embodiments of the invention for further investigation. An alert record may include all the information required for the investigation. For example, the alert record may include a transaction ID and a transaction time stamp, which allows a fraud investigator to look at the transaction in the IDB 921 and to decide on a desired action. The send alert to queue module 914 may gather information on the alert from the enriched transaction data for creating a construct that represents an alert. The alert may then be sent to the queue by the send alert to queue module 914. The build and distribute alert module 917 may receive the alerts from the queues module 918 and may store them to the alerts database 922. The save tuning data module 915 may be a subset of the transaction data saved in the application database 920 that allows data scientists to use this data in machine-learning to train models based on the data and to create AI scoring models that can be combined in the open analytics module 907.

Reference is made to FIG. 10, which is a screenshot of a profile fetch before transmitting a new incoming transaction to embodiments of the invention.

The initial profile data for February 2019 contains the following profile aggregation data statistics:

| Function | Value |
| --- | --- |
| Count | 6.0 |
| Sum | $2400.0 |
| Min | −$ 200.0 |
| Max | $1200.0 |
| Average | $ 400.0 |

Reference is made to FIG. 11, which is a screenshot of a profile fetch after transmitting two new incoming transactions to a real-time analytics detection system as disclosed herein, but before the profile has been updated in the profile table, according to embodiments of the invention.

The two consecutive transactions sent to the system on Feb. 2, 2019 at 14:00 that have not been utilized to update the profile in the profile table are for $2000 and $1800. While the profile table has not yet been updated, FIG. 11 shows that the profile fetch of the above disclosed system still returns the following up-to-date profile aggregation data which takes into account the two consecutive transactions. For example, the retrieved profile data may contain the following example profile aggregation data:

| Function | Value |
| --- | --- |
| Count | 8 |
| Sum | $6200.0 |
| Min | −$ 200.0 |

-continued

| Function | Value |
|---|---|
| Max | $2000.0 |
| Average | $ 775.0 |

The following discussion is to demonstrate the difference between asynchronous and synchronous profile updates.

An example of payment transactions for an account 1278-12****105 profile:

| Transaction ID | Time stamp | Amount |
|---|---|---|
| 9C0112D6-1D71 | 12:00:01 01/01/2018 | $250,000.00 |
| 7D2112D6-1B73 | 12:00:03 01/01/2018 | $200,000.00 |
| 4D211D6-1B72 | 12:00:05 01/01/2018 | $300,000.00 |
| 9C0112D6-1E77 | 12:00:09 01/01/2018 | $ 10,000.00 |
| 5C01112D6-1E87 | 12:00:11 01/01/2018 | $ 1,000.00 |

An asynchronous profile update may not include the two most recent transactions, and thus would show that the last transaction time was 12:00:05 and the profile may include the following information:

| Profile Key | Average | Min | Max |
|---|---|---|---|
| 1278-12****105 | $250,000.00 | $200,000.00 | $300,000.00 |

In contrast, in the synchronous profile update, discussed elsewhere herein, even if the profile table has not been updated to include the two most recent updates, embodiments of the invention may still be able to utilize an up-to-date profile, such as the following:

| Profile Key | Average | Min | Max |
|---|---|---|---|
| 1278-12****105 | $152,200.00 | $1,000.00 | $300,000.00 |

Accordingly, embodiments of the invention may provide faster, more scalable, and more accurate analytics than traditional systems and methods.

It will thus be seen that the objects set forth elsewhere herein, among those made apparent from the preceding description, are efficiently attained and, because certain changes may be made in carrying out the method described elsewhere herein and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

The invention claimed is:

1. A real-time analytics detection system comprising:
a database;
a memory; and
one or more processors configured to, in response to receiving a current incoming transaction:
retrieve, from a profile table of the database, a most recent profile aggregation data for an entity associated with the current incoming transaction;
derive a current profile update from the current incoming transaction;
store the current profile update in a profile update table of the database, wherein the profile update includes:
at least one update amount;
a timestamp; and
merging instructions describing how to update the most recent profile aggregation data based on the at least one update amount; and
retrieve, from the profile update table of the database all recent profile updates corresponding to the entity, wherein each of the recent profile updates have a timestamp which is more recent than the last time the most recent profile aggregation data was updated;
derive a first up-to-date profile aggregation data from the most recent profile aggregation data and the retrieved recent profile updates
store the first up-to-date profile aggregation data in the memory; and
update the most recent profile aggregation data in the profile table to be the first up-to-date profile aggregation data asynchronously to the one or more processors performing real-time analytics detection, wherein the most recent profile aggregation data is updated in a consistent manner without utilizing an update lock on the profile table, wherein after performing the real-time analytics detection, the one or more processors are configured to:
transmit a current profile re-calculation trigger to a message queue, wherein:
the current profile re-calculation trigger is associated with the current profile update; and
the re-calculation trigger comprises a primary key which is associated with the entity and which was derived from a previous transaction associated with the entity.

2. The real-time analytics detection system of claim 1, wherein the one or more processors are configured to, after performing the real-time analytics detection:
extract a next primary key from a next re-calculation trigger;
retrieve a profile row from the profile table which comprises profile aggregation data and the next primary key;
retrieve at least one profile update row from the profile update table, wherein each of the at least one profile update rows comprise:
the primary key;
a recent profile update; and
a timestamp which is:
more recent than the last time the most recent profile aggregation data was last updated; and
earlier than a current time in a clock of the database minus a predetermined synchronization period; and
derive a second up-to-date profile aggregation data from the retrieved profile row and the retrieved at least one profile update rows.

3. The real-time analytics detection system of claim 2, wherein the one or more processors are configured to update the profile aggregation data in the profile row in the profile table to be the second up-to-date profile aggregation data if a most recent timestamp of the at least one profile update row is more recent than the last time the most recent profile aggregation data was last updated.

4. The real-time analytics detection system of claim 3, wherein the profile row further comprises a last update timestamp which indicates when the profile row was last updated, and the one or more processors are configured to update the last update timestamp of the profile row to be the most recent timestamp of the at least one profile update row after updating the profile row in the profile table.

5. The real-time analytics detection system of claim 2, wherein the predetermined synchronization period is larger than a maximum potential time difference between different clocks in the real-time analytics detection system and is in an order of milliseconds.

6. The real-time analytics detection system of claim 1, wherein the most recent profile aggregation data comprises statistical aggregators derived from previously received transactions associated with the entity.

7. The real-time analytics detection system of claim 1, wherein the one or more processors are configured to perform real-time analytics detection on the current incoming transaction by utilizing the first up-to-date profile aggregation data to determine to determine if the current incoming transaction is valid, should be blocked, or if the one or more processors should generate an alert.

8. A method for performing real-time analytics detection, the method comprising:
in response to receiving a current incoming transaction:
deriving, using the one or more processors, a current profile update from the current incoming transaction;
storing the current profile update in a profile update table of a database, wherein the profile update includes:
at least one update amount;
a timestamp; and
merging instructions describing how to update the most recent profile aggregation data based on the at least one update amount; and
retrieving a most recent profile aggregation data for an entity associated with the current incoming transaction from a profile table of a database;
retrieving all recent profile updates corresponding to the entity from the profile update table, wherein each recent profile update has a timestamp which is more recent than the last time the most recent profile aggregation data was updated;
deriving, using the one or more processors, a first up-to-date profile aggregation data from the most recent profile aggregation data and the retrieved recent profile updates;
storing the first up-to-date profile aggregation data in a memory of the one or more processors; and
updating the most recent profile aggregation data in the profile table, in a consistent manner without utilizing an update lock on the profile table, asynchronously to the one or more processors performing real-time analytics detection;
after performing the real-time analytics detection, the one or more processors transmitting a current profile re-calculation trigger to a message queue, wherein:
the current profile re-calculation trigger is associated with the current profile update; and
the re-calculation trigger comprises a primary key which is associated with the entity and which was derived from a previous transaction associated with the entity.

9. The method of claim 8, further comprising, after performing the real-time analytics detection:
extracting, using the one or more processors, a next primary key form a next re-calculation trigger;
retrieving a profile row from the profile table which comprises profile aggregation data and the next primary key;
retrieving at least one profile update row from the profile update table, wherein each of the at least one profile update rows comprise:
the primary key,
a recent profile update; and
a timestamp which is:
more recent than the last time the most recent profile aggregation data was last updated; and
earlier than a current time in a clock of the database minus a predetermined synchronization period; and
deriving, using the one or more processors, a second up-to-date profile aggregation data from the retrieved profile row and the retrieved at least one profile update rows.

10. The method of claim 9, further comprising updating, using the one or more processors, the profile aggregation data in the profile row in the profile table to be the second up-to-date profile aggregation data if a most recent timestamp of the at least one profile update row is more recent than the last time the most recent profile aggregation data was last updated.

11. The method of claim 10, wherein the profile row further comprises a last update timestamp which indicates when the profile row was last updated, and the one or more processors are configured to update the last update timestamp of the profile row to be the most recent timestamp of the at least one profile update row after updating the profile row in the profile table.

12. The method of claim 9, wherein the predetermined synchronization period is in an order of milliseconds.

13. The method of claim 12, wherein the predetermined synchronization period is larger than a maximum potential time difference between different clocks in the real-time analytics detection system.

14. The method of claim 8, further comprising, performing, using the one or more processors, real-time analytics detection on the current incoming transaction by utilizing the first up-to-date profile aggregation data to determine to determine if the current incoming transaction is valid, should be blocked, or if the one or more processors should generate an alert.

15. A real-time analytics detection system comprising:
a database; and
one or more processors configured to, in response to receiving a current incoming transaction:
derive a current profile update from the current incoming transaction;
retrieve, from a profile table of the database, a most recent profile aggregation data for an entity associated with the current incoming transaction;
derive an up-to-date profile aggregation data from the most recent profile aggregation data and the most recent profile updates synchronously with performing real-time analytics detection on the current incoming transaction; wherein the most recent profile updates include the current profile update and any other profile updates which correspond to the entity and have a timestamp which is more recent than the last time the most recent profile aggregation data was updated; and
update the most recent profile aggregation data in the profile table asynchronously to the one or more processors performing real-time analytics detection without utilizing an update lock, wherein the most recent profile aggregation data in the profile table is updated based on only the most recent profile updates which have a timestamp which is earlier than a current time in a clock of the database minus a predetermined synchronization period, wherein after performing the real-time analytics detection, the one or more processors are configured to:

transmit a current profile re-calculation trigger to a message queue, wherein:

the current profile re-calculation trigger is associated with the current profile update; and the re-calculation trigger comprises a primary key which is associated with the entity and which was derived from a previous transaction associated with the entity.

* * * * *